United States Patent
Kwak et al.

(10) Patent No.: US 9,122,319 B2
(45) Date of Patent: Sep. 1, 2015

(54) FLEXIBLE DISPLAY APPARATUS AND CONTROLLING METHOD THEREOF

(71) Applicant: Samsung Electronics Co. Ltd., Suwon-si, Gyeonggi-do (KR)

(72) Inventors: Ji-yeon Kwak, Seoul (KR); Sang-keun Jung, Suwon-si (KR); Jung-joo Sohn, Seoul (KR); Hyun-jin Kim, Seoul (KR); Geun-ho Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 80 days.

(21) Appl. No.: 13/969,845

(22) Filed: Aug. 19, 2013

(65) Prior Publication Data

US 2014/0049464 A1 Feb. 20, 2014

(30) Foreign Application Priority Data

Aug. 20, 2012 (KR) .......................... 10-2012-0090722

(51) Int. Cl.
G09G 5/00 (2006.01)
G06F 3/03 (2006.01)
G06F 3/0487 (2013.01)
G06F 1/16 (2006.01)
G06F 3/01 (2006.01)
G06F 3/041 (2006.01)

(52) U.S. Cl.
CPC ................ *G06F 3/03* (2013.01); *G06F 1/1652* (2013.01); *G06F 3/017* (2013.01); *G06F 3/0414* (2013.01); *G06F 3/0487* (2013.01); *G06F 2203/04102* (2013.01)

(58) Field of Classification Search
CPC ....... G06F 1/1652; G06F 3/03; G06F 3/0414; G06F 2203/04102
USPC .................................................. 345/156–184
See application file for complete search history.

(56) References Cited

U.S. PATENT DOCUMENTS

| | | | |
|---|---|---|---|
| 8,462,106 B2 * | 6/2013 | Tziortzis et al. | 345/156 |
| 2007/0097014 A1 * | 5/2007 | Solomon et al. | 345/1.1 |
| 2010/0045705 A1 | 2/2010 | Vertegaal et al. | |
| 2010/0056223 A1 | 3/2010 | Choi et al. | |
| 2010/0060548 A1 * | 3/2010 | Choi et al. | 345/1.3 |
| 2010/0117975 A1 | 5/2010 | Cho | |
| 2010/0164888 A1 * | 7/2010 | Okumura et al. | 345/173 |
| 2010/0182265 A1 * | 7/2010 | Kim et al. | 345/173 |
| 2011/0095975 A1 | 4/2011 | Hwang et al. | |
| 2012/0235894 A1 * | 9/2012 | Phillips | 345/156 |

* cited by examiner

Primary Examiner — Michael Pervan
Assistant Examiner — Andrew Lee
(74) Attorney, Agent, or Firm — Jefferson IP Law, LLP

(57) ABSTRACT

A flexible display apparatus is provided. The flexible display apparatus includes a display configured to display content on a screen, a sensor configured to detect bending of the display from a first form to a second form, and a controller configured to reconstruct the content based on the bending and to display the reconstructed content in a first screen generated in one region of the display when it is determined that the display is restored to the first form.

16 Claims, 42 Drawing Sheets

FIG. 40A
FIG. 40B
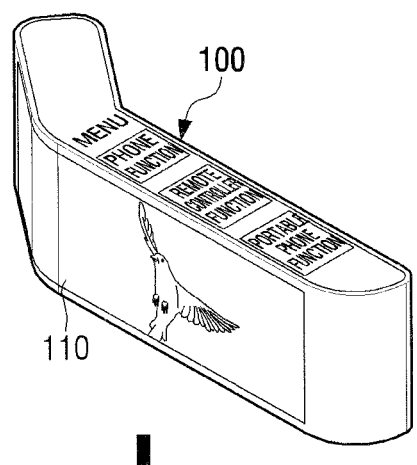
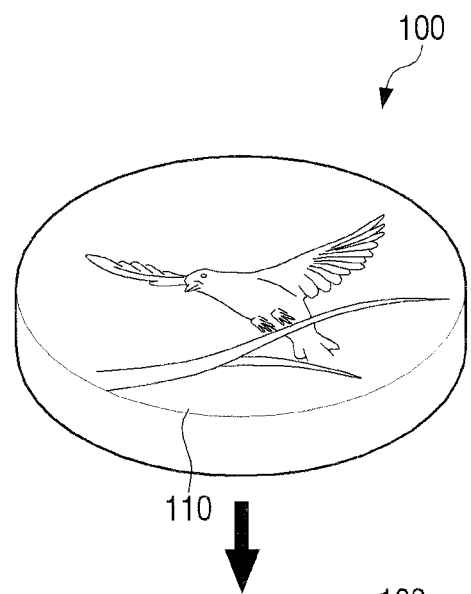
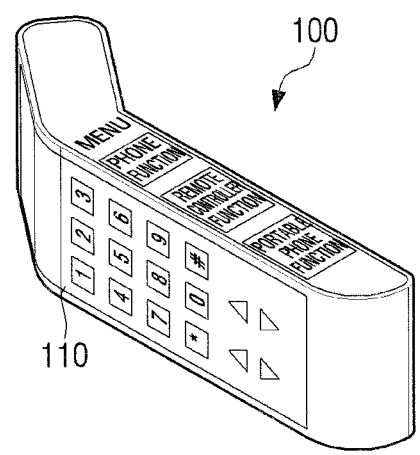
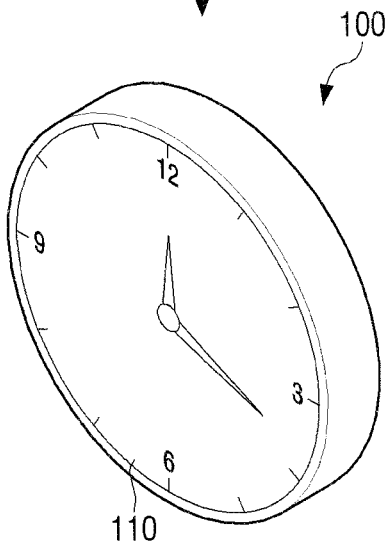

FLEXIBLE DISPLAY APPARATUS AND CONTROLLING METHOD THEREOF

CROSS-REFERENCE TO RELATED APPLICATION(S)

This application claims the benefit under 35 U.S.C. §119(a) of a Korean patent application filed on Aug. 20, 2012 in the Korean Intellectual Property Office and assigned Ser. No. 10-2012-0090722, the entire disclosure of which is hereby incorporated by reference.

TECHNICAL FIELD

The present disclosure relates to a flexible display apparatus and a method of controlling the same. More particularly, the present disclosure relates to a bendable flexible display apparatus and a method of controlling the same.

BACKGROUND

With the development of electronic technology, various types of display apparatuses have been developed. In particular, display apparatuses such as Televisions (TVs), Personal Computers (PCs), tablet PCs, portable phones, and MPEG audio layer-3 (MP3) players have been distributed so that they are now used in most homes.

In recent years, to meet needs of users who want newer and various functions, attempts to develop new types of display apparatuses have been made. So called, the display apparatuses are called next-generation displays.

As one example of the next-generation display apparatuses, there are flexible display apparatuses. The flexible display apparatuses may be defined as display apparatuses having a shape-transformable property like a paper.

Since a user may allow the flexible display apparatuses to be bent and transformed in a shape through application of force, the flexible display apparatuses may be used for various purposes. For example, the flexible display apparatus may be implemented into portable apparatuses such as portable phones, tablet PCs, electronic photo frames, Personal Digital Assistant (PDAs), or MP3 players.

The flexible display apparatuses have a flexible property unlike existing display apparatuses. Therefore, there is a need for a method for applying the flexible property to an operation of the display apparatuses.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a flexible display apparatus, which provides various functions according to a bending-flap manipulation to be restored to an original state after bending and a method of controlling the same.

According to an aspect of the present disclosure, a flexible display apparatus is provided. The flexible display apparatus may include a display configured to display content on a screen, a sensor configured to detect bending of the display from a first form to a second form, and a controller configured to reconstruct the content based on the bending and display the reconstructed content in a first screen generated in one region of the display when it is determined that the display is restored to the first form.

The one region of the display may be one of a plurality of regions divided by a bending line generated based on the bending.

The first form may be a state in which the display is flat, and the second form may be a state in which a partial region of the display is bent.

The controller may display the content according an editing condition in a second screen generated on a remaining region of the display when the bending is detected and the editing condition for the content are displayed on the screen.

The controller may display the content according an editing condition in the entire screen when the bending is detected and the editing condition for the content are displayed on the screen.

The controller may display related content or main content corresponding to the content in a second screen generated in a remaining region of the display based on the bending, and the content may include one or more of an application execution screen, a web page, an image, text, a moving image, a widget screen, a menu screen, and an icon.

The controller may display a content-added application execution screen on the first screen when the bending is detected and the content and an application execution screen to which the content is addible are displayed on the screen.

The controller may generate and display a third screen on the one region of the first screen when the bending of the first screen is detected.

The controller may generate and display the first screen on the one region of the display to correspond to a preset bending structure when the bending is detected and the flexible display apparatus is combined with a display accessory having the preset bending structure.

The flexible display apparatus may further include a storage unit configured to User Interface (UI) screen information corresponding to a size of the first screen that is generated based on the bending. The controller may reconstruct the content displayed in the first screen based on the UI screen information corresponding to the size of the first screen.

According to an aspect of the present disclosure, a method of controlling a flexible display apparatus is provided. The method may include displaying content on a screen, detecting bending of the display from a first form to a second form, and reconstructing the content based on the bending and displaying the reconstructed content on a first screen generated in one region of the display when it is determined that the display is restored to the first form.

The one region of the display may be one of a plurality of regions divided by a bending line generated based on the bending.

The first form may be a state in which the display is flat, and the second form may be a state in which a partial region of the display is bent.

The reconstructing and the displaying of the content may include displaying the content according an editing condition in a second screen generated in a remaining region of the display when the bending is detected and the editing condition for the content is displayed on the screen.

The reconstructing and the displaying of the content may include displaying the content according an editing condition in the entire screen when the bending is detected and the editing condition for the content is displayed on the screen.

The reconstructing and the displaying of the content may include displaying related content or main content corresponding to the content in a second screen generated in a remaining region of the display based on the bending, and the content may include one or more of an application execution screen, a web page, an image, text, a moving image, a widget screen, a menu screen, and an icon.

The reconstructing and the displaying of the content may include displaying a content-added application execution screen on the first screen when the bending is detected and the content and an application execution screen to which the content is addible are displayed on the screen.

The method may further include generating and displaying a third screen on the one region of the first screen when the bending of the first screen is detected.

The reconstructing and the displaying of the content may include generating and displaying the first screen on the one region of the display to correspond to a preset bending structure when the bending is detected and the flexible display apparatus is combined with a display accessory having the preset bending structure.

The reconstructing and the displaying of the content may include reconstructing the content displayed in the first screen based on User Interface (UI) screen information corresponding to a size of the first screen.

According to the above-described various embodiments, the flexible display apparatus may provide various functions according to a bending-flap operation.

Other aspects, advantages and salient features of the disclosure will be apparent to those skilled in the art from the following detailed description, which, taken in conjunction with the annexed drawings, discloses various embodiments of the present disclosure.

BRIEF DESCRIPTION OF THE DRAWING

The above and other aspects, features, and advantages of certain embodiments of the present disclosure will be more apparent from the following description taken in conjunction with the accompanying drawings, in which:

FIGS. 40A, 40B, 41, and 42 are views illustrating implementation types of a flexible display apparatus according to various embodiments of the present disclosure.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
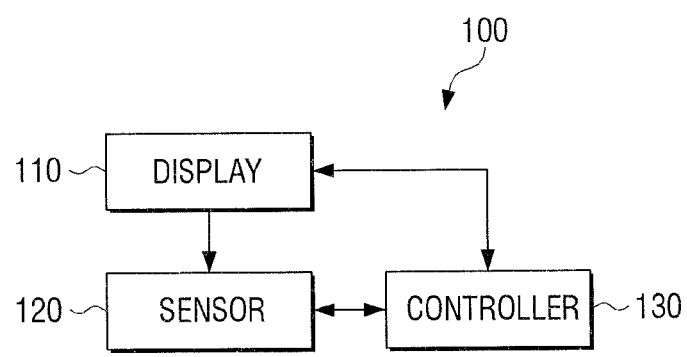
FIG. 1 is a block diagram illustrating a flexible display apparatus according to an embodiment of the present disclosure.

FIG. 1 is a block diagram illustrating a flexible display apparatus according to an embodiment of the present disclosure.

Referring to FIG. 1, a flexible display apparatus 100 includes a display 110, a sensor 120, and a controller 130.

The display 110 may display a screen. The flexible display apparatus 100 including the display 110 has a bendable or foldable property. For example, the flexible display apparatus 100 may be implemented in a foldable structure like a notebook. The flexible display apparatus 100 may be implemented so that a folded location is changed according to a display accessory such as a hinge, a cover, and the like. Therefore, the display 110 may be fabricated in a bendable structure and with a bendable material. A detailed configuration of the display 110 will be described later.

The sensor 120 detects the bending or folding of the display 110. The folding refers to a folding state in which a radius of curvature of a partial or whole area of the flexible display apparatus 100 is smaller than a reference value. Therefore, a general bending is a state in which a radius of curvature of a part or whole area is larger than the reference value, and may be distinguished from the folding state.

The folding and the general bending may be distinguished according to a degree of the bending. For example, when a bending of a certain bending angle or more is made, the bending is referred to as the folding state. When bending of below the certain bending angle is made, the bending is referred to as the general bending. Further, even when bending of a certain bending angle or more is made, the bending is referred to as the general bending when a radius of curvature is larger than the reference value.

The folding may be a manipulation in which screens of the flexible display apparatus 100 face to be in contact with each other or face to be in proximity to each other. Here, the contact or proximity state of the screens may be recognized through a touch sensor, a proximity sensor, an infrared (IR) sensor, and the like.

Hereinafter, for convenience of description, both the bending and the folding may be commonly referred to as bending.

When bending of the display 110 is detected, the controller 130 may perform an operation corresponding to the detected bending.

When it is determined that the flexible display apparatus 100 is restored to a first form after being bent from the first form to a second form according to the detected result of the sensor 120, the controller 130 may perform a function corresponding to the manipulation. Here, the first form is a state in which the display 110 is flat, and the second form is a state in which at least partial region of the display 110 is bent.

Hereinafter, a manipulation, in which a series of operations in which the flexible display apparatus 100 is restored to the original state occur within a preset period of time after bending, may be called a bending-flap manipulation.

For example, when the bending-flap operation is detected in a state in which content is displayed in a screen, the controller 130 may reconstruct and display the content in a first screen generated on one region of the display 110 based on the bending. Here, the one region of the display 110 may be one of a plurality of regions that are divided by a bending line generated based on the bending. Here, the bending line may be defined as a virtual line connecting points in which the largest resistance values are detected in the bending regions.

The controller 130 may display a second screen including a result according to a function performed based on the bending in a remaining region other than the region in which the first screen is generated. Here, the first screen and the second screen may be distinguished by the bending line.

The controller 130 may display the first screen generated based on the bending by overlapping an original image in an On Screen Display (OSD) form or a pop-up form in a state in which a display image displayed in an entire screen is maintained.

When the bending is detected in a state in which the flexible display apparatus 100 is combined with a display accessory having a preset bending structure, the controller 130 may generate and display the first screen on one region of the display 110 to correspond to the preset bending structure. Further, the controller 130 may generate the second screen on the remaining region of the display 110 to correspond to the preset bending structure. Here, the display accessory may be, for example, a cover of the flexible display apparatus 100 folded in a preset form, or the like.

The controller 130 may perform different functions according to a location of a bending region, a degree of bending, a bending direction, bending speed, the number of bending, and the like. For example, the controller 130 may perform different functions according to a case in which a whole area or a partial area of the flexible display apparatus 100 is bent, a case in which the flexible display apparatus is bent to a Z+ direction or Z− direction, and the like. Detailed description thereof will be described later with reference to accompanying drawings.

The functions performed based on the bending may be variously implemented according to a type of the flexible display apparatus 100. That is, the flexible display apparatus 100 may perform a function based on performed bending among the functions.

In one embodiment, when the flexible display apparatus 100 is a portable phone, the controller 130 may perform an operation of a user's manipulation among various operations such as phone connection, call blocking, menu display, text sending and receiving, application selection and execution, or web browser execution and completion. In another embodiment, when the flexible display apparatus 100 is a TeleVision (TV), the controller may perform an operation corresponding to a user's manipulation among various operations, such as channel selection, volume adjustment, luminance adjustment, color adjustment, or contrast adjustment. In addition, the flexible display apparatus 100 may be implemented as various types of display apparatuses such as a Personal Digital Assistant (PDA), an electronic photo frame, an electronic book, an electronic notebook, a MPEG audio layer-3 (MP3) player, a tablet Personal Computer (PC), a laptop computer, or a monitor, and perform various operations suitable for the apparatuses. Further, the flexible display apparatus 100 may perform general operations, such as a locking operation, an unlocking operation, a turn-on operation, or a turn-off operation, regardless of a type of the flexible display apparatus 100.

In addition, the functions performed based on the bending may be variously implemented according to information displayed on the flexible display apparatus 100.

For example, when the bending is detected in a state in which content and an editing condition for the content are displayed on a screen, the controller 130 may control to reconstruct and display the content in a first screen generated in one region of the display 110, and to display the content edited according to the editing condition in a second screen generated in the remaining region.

When the bending is detected in a state in which the content and the editing condition for the content are displayed on a screen, the controller 130 may display the content edited according to the editing condition in an entire screen.

When the bending is detected in a state in which preset content is displayed on the screen, the controller 130 may reconstruct and display content in the first screen generated on one region of the display 110 based on the bending, and display related content or main content corresponding to the content in the second screen generated on the remaining region of the display 110. Here, the preset content may include, for example, one or more of an application execution screen, a web page, an image, text, a moving image, a widget screen, a menu screen, and an icon.

When bending is detected in a state in which content and an application execution screen to which the content is addible are displayed, the controller 130 may reconstruct the application execution screen, and display a content-added application execution screen in the first screen or an entire screen. For example, when a bending-flap manipulation, in which two screens contact each other is bent and then released, and when a screen displays a content-addible application execution screen such as a text creation screen or an e-mail creation screen, and the content to be displayed in split screens, respectively, is provided, a screen, to which content displayed in the text message creation screen or the e-mail creation screen is added.

When bending for the first screen generated on one region of the display 110 is detected, the controller 130 may generate and display a third screen on one region of the first screen based on the bending. Specifically, when second bending in which the first screen is bent in half is detected in a state in which the first screen is formed on the left half region and the second screen is generated on the right half region, based on first bending in which the display is bent in half, the controller may generate and display a third screen on the left quarter region, and generate and display a fourth screen in an adjacent quarter region. At this time, the results of various functions for the content displayed in the first screen may be displayed in the third screen. For example, the content displayed in the first screen may be copied to the third screen to be displayed.

In some cases, when the bending is detected in a state in which only a specific content is displayed on a screen, the controller 130 may perform different functions according to a type of content displayed on the screen.

For example, the bending-flap manipulation is performed in a state in which an image or a text document is displayed, the controller may perform a function to edit the image, and display the edited image. When the bending-flap manipulation of the user is detected in a state in which a web page is displayed, the controller may perform a function to additionally display a main web page.

When the bending-flap manipulation is performed in a state a specific application execution screen is displayed, the controller may display the application execution screen on one of a plurality of screens generated based on the bending, and additionally display another application execution screen on the other screen. Further, when the bending-flap manipulation is detected in a state in which a specific content execution screen requiring a control function is displayed, the controller may additionally display a control screen for controlling the content execution screen.

Further, when the control screen according to different levels is necessary, the controller may display the control screen corresponding to the different levels on a plurality of screens according to the bending-flap manipulation. Information for the control function may have been pre-stored.

When the bending-flap manipulation is performed in a state in which a specific type of content is displayed, the controller may display the content that is originally displayed in one of a plurality of screens generated based on the bending, and display an application screen related to a preset function in connection with the type of the content. For example, when the bending-flap manipulation is performed in a state in which image content is displayed, the controller may displays an image editing function screen, a screen for transmitting an image file, and the like.

Further, the controller may perform a function to swap a plurality of subjects displayed on the screen.

In addition, the controller may perform various copying functions based on the bending-flap manipulation. For example, when a web page is displayed, the controller may display an original web page in one of the screens generated based on a bending line and copy and display a web link address corresponding to the original web page in the other generated screens according to the bending-flap manipulation.

When the bending-flap manipulation is performed in a state in which a web link address is displayed in one of split screens according to the preset event, the controller may display a web page screen corresponding to the web link address in a screen generated based on bending.

The controller may perform functions, such as an application copy, an image copy, and a general file copy, for copying an application, an image, a general file, and the like displayed in a screen according to the bending-flap manipulation.

The controller may perform a page capture function for capturing a page displayed in a screen as it is, and displaying the captured image in split screens according to the bending-flap manipulation.

When a screen is generated according to the bending-flap manipulation, the controller 130 may calculate a size of the generated screen, and reconstruct and display content, a User Interface (UI) element, and the like to be displayed in the screen to match the calculated size of the screen.

For example, the controller 130 may rescale and display the target content, the UI element, and the like to match the calculated size of the screen. At this time, a size, a ratio, and the like of the UI, the content, and the like to be displayed in the screen may be changed. Further, the controller 130 may reduce and display only the size while maintaining a display ratio so that all target images are included and displayed in the calculated screen size.

The controller 130 may scale a size of a portion of the content according to the generated screen size or reconstruct a screen in a form in which the portion of the content are excluded.

The controller 130 may display a portion of the target image matching the generated screen size on the screen.

The controller may display content displayed in the generated screen, for example, original content and edited content in respective screens in the same form. That is, when the original content is displayed so that a display ratio is maintained and a size is reduced to match a size of a split screen, the edited content may also be displayed in the same form in which only a size thereof is reduced.

The above-described various embodiments illustrate that the display image is substantially generated in real time to match the size of the screen generated based on pre-stored screen information, but this is merely exemplary. That is, content or a UI screen image to be displayed in the screen based on bending may be pre-stored in the storage unit (not shown) or received from an external server. For example, the number of and arrangement of content lists to be included in a UI screen according to a size of a screen region, and items for configurations to be included the content list may be previously set and stored.

As described above, the display 110 may be manufactured in a bendable form. The sensor 120 may detect a bending state of the display 110 through various methods.

Hereinafter, a detailed configuration of the display 110 and a method of detecting the bending of the display will be described in detail.

<Structure of Flexible Display and Example of Bending Detection Method>

Figure 2:
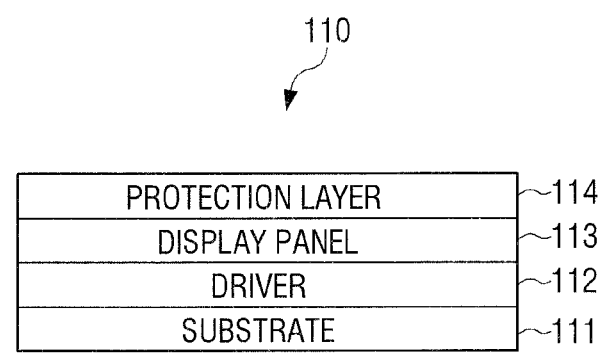
FIG. 2 is a view illustrating a basic structure of a flexible display apparatus according to an embodiment of the present disclosure.

FIG. 2 is a view illustrating a basic structure of a flexible display apparatus according to an embodiment of the present disclosure.

Referring to FIG. 2, the display 110 includes a substrate 111, a driver 112, a display panel 113, and a protection layer 114.

The flexible display apparatus 100 may an apparatus that is bendable, wrapable, foldable, or rollable like a paper in a state in which display attributes of an existing flat panel display apparatus are retained. Therefore, the flexible display apparatus 100 may be fabricated on a flexible substrate.

Specifically, the substrate 111 may be implemented as a plastic substrate (for example, a polymer film), which is transformable by external pressure.

The plastic substrate has a structure in which barrier coating is processed on either side of a base film. The base film may include various types of resins such as Polylmide (PI), PolyCarbonate (PC), Polyethyleneterephtalate (PET), Polyethersulfone (PES), Polythylenenaphthalate (PEN), Fiber Reinforced Plastic (FRP). The barrier coating is performed on surfaces of the base film, and an organic layer or an inorganic layer may be used to maintain flexibility.

The substrate 111 may include a material having a flexible property such as thin glass or a metal foil, in addition to the plastic substrate.

The driver 112 functions to drive the display panel 113. Specifically, the driver 112 may apply driving voltages to a plurality of pixels constituting the display panel 113, and may be implemented with an amorphous Silicon Thin Film Transistor (a-Si TFT), a Low Temperature PolySilicon (LTPS) TFT, an Organic TFT (OTFT), and the like. The driver 112 may be implemented by various types according to an implementation type of the display panel 113. In an embodiment, the display panel 113 may include a plurality of pixel cells whereby each of the pixel cells include an organic emitter and electrode layers covering either side of the organic emitter. The driver 112 may include a plurality of transistors corresponding to each of the pixel cells of the display panel 113. The controller 130 applies an electrical signal to a gate of each transistor to allow a pixel cell connected to the transistor to emit light. Therefore, an image may be displayed.

The display panel 113 may be implemented with an ElectroLuminance (EL) display, an Electrophoretic Display (EPD), an ElectroChromic display (ECD), a Liquid Crystal Display (LCD), Active Matrix LCD (AMLCD), a Plasma Display Panel (PDP), and the like, in addition to an organic light-emitting diode. However, since an LCD does not emit light by itself, a separate backlight may be necessary. An LCD which does not use a backlight uses ambient light. Therefore, a condition such as an outdoor environment having an abundance of light can to be satisfied to use the LCD display panel 113 without the backlight.

The protection layer 114 functions to protect the display panel 113. For example, a material such as Zirconium Oxide (ZrO), Cerium Oxide (CeO2), or Thorium Oxide (ThO2) may be used as the protection layer 114. The protection layer 114 may be fabricated in a transparent film type and cover an entire surface of the display panel 113.

Figure 3:
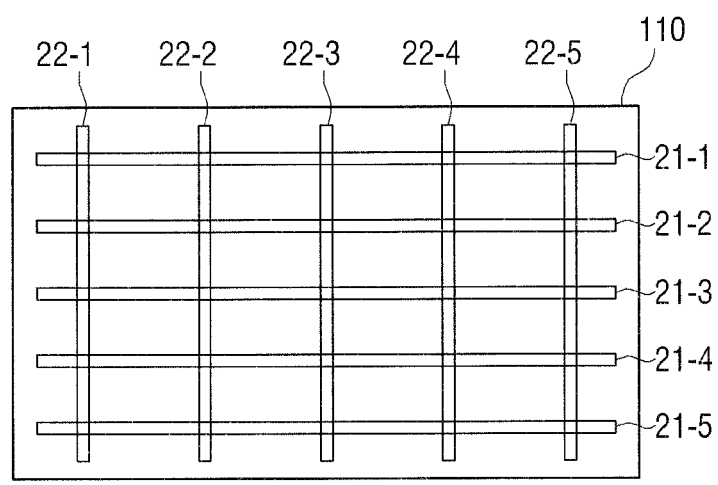
FIGS. 3, 4, and 5 are views illustrating examples of a method of detecting shape transformation in a flexible display apparatus according to various embodiments of the present disclosure.

As illustrated in FIG. 3, the display 110 may be implemented with an electronic paper. The electronic paper is a display with an attribute of a general ink is applied to a paper, and is different from a general flat display in that the electronic paper uses reflected light. The electronic paper may change a picture or text through an electrophoresis using a twist ball or a capsule.

When the display 110 may be formed of a transparent material, the display 110 may be implemented as a transparent bendable display apparatus. For example, when the substrate 111 may include a polymer material such as plastic having a transparent property, the driver 112 may include a transparent transistor, and the display panel 113 includes a transparent organic light-emitting layer and a transparent electrode, the display 110 is transparent.

The transparent transistor may be referred to as a transistor fabricated by replacing opaque silicon of an existing TFT with a transparent material such as transparent zinc oxide, or transparent titanium oxide. The transparent electrode may include Indium Tin Oxide (ITO). Alternatively, the transparent electrode may include a new material such as graphene. The graphene may be referred to as a material has a structure in which carbons atoms are connected to form a honey comb-shaped plane, and has a transparent property. Further, the transparent organic light-emitting layer may be implemented with various materials.

Figure 4:
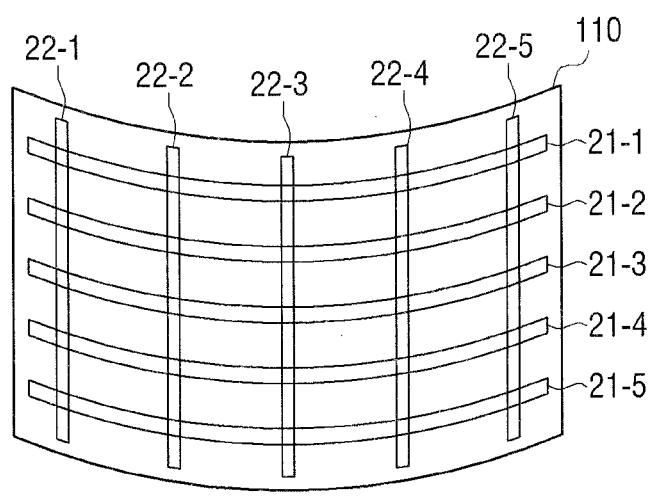
Figure 5:
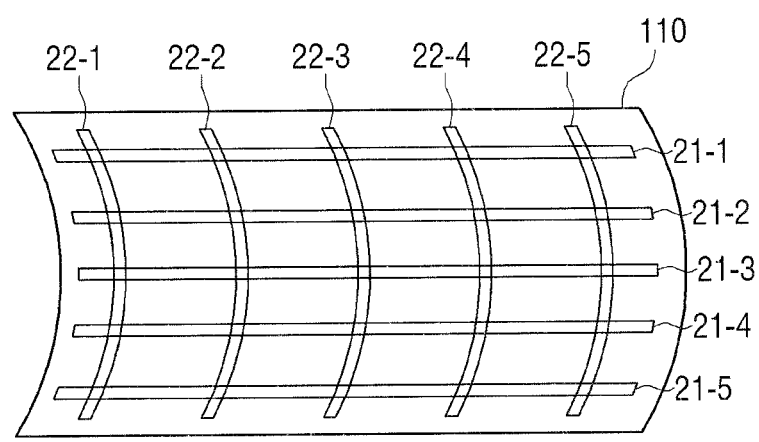

FIGS. 3, 4, and 5 are views illustrating examples of a method of detecting shape transformation in a flexible display apparatus according to various embodiments of the present disclosure.

The flexible display apparatus 100 may be bent by applying an external pressure. The bending may include general bending, folding, rolling, and the like. The general bending means a state in which the flexible display apparatus is bent.

The folding means a state in which the flexible display apparatus is folded. The folding has been described above, and thus detailed description thereof will be omitted.

The rolling means a state in which the flexible display apparatus is rolled. The rolling may be also determined on the basis of a bending angle. For example, the rolling may be defined as a state in which bending of a certain bending angle or more is detected over a certain region. On the other hand, the folding may be defined as a state in which bending of below a certain bending angle is detected in a relatively smaller region than the rolling. The above-described general bending, folding, rolling, and the like may be determined on the basis of a radius of curvature in addition to the bending angle.

Further, the rolling may be defined as a state in which a cross-section when the flexible display apparatus 100 is rolled substantially has a circular or elliptical shape regardless of the radius of curvature.

However, the various examples of shape transformation as described above are merely exemplary, and the transformed shape may be defined differently according to a type, a size, a weight, and/or a characteristic of the flexible display apparatus. For example, when surfaces of the flexible display apparatus 100 are bendable to be in contact with each other, the folding may be defined as a state in which the surfaces of the flexible display apparatus are in contact with each other, at the same time of the bending. The rolling may be defined as a state in which a front surface and a rear surface of the flexible display apparatus are to be in contact with each other due to the bending.

For convenience of description, herein, the various types of bending and other bending are collectively called bending.

The flexible display apparatus 100 may detect the bending through various manners.

For example, the sensor 120 may include a bend sensor disposed in one surface such as a front surface or a rear surface of the display 110 or bend sensors disposed in both surfaces thereof The controller 130 may detect the bending using a sensed value in the bend sensor of the sensor 120.

Here, the bend sensor may be referred to as a sensor that is bendable itself and has a resistance value that changes according to a degree of the bending. The bend sensor may be implemented in a various types, such as an optical bending sensor, a pressure sensor, or a strain gauge.

The sensor 120 may sense the resistance value of the bend sensor using a voltage that is applied to the bend sensor or an intensity of a current flowing in the bend sensor, and detect a bending state of a location of the bend sensor according to the magnitude of the resistance value.

FIG. 3 illustrates that the bend sensor is embedded in a front surface of the display 110, but this is merely exemplary, and the bend sensor may be embedded in a rear surface of the display 220 or in both surfaces of the display 110. Further, a shape and an arrangement location of the bend sensor and the number of bend sensors may be variously changed. For example, one bend sensor or a plurality of bend sensors may be combined with the display 110. Here, one bend sensor may detect one piece of bending data or one bend sensor may have a plurality of sensing channels configured to sense a plurality of pieces of bending data.

FIG. 3 illustrates the example in which a plurality of bar-shaped bend sensors that are disposed in a longitudinal direction and a lateral direction to form a lattice form according to an embodiment of the present disclosure.

Referring to FIG. 3, the bend sensor includes bend sensors 21-1 to 21-5 arrayed in a first direction and bend sensors 22-1 to 22-5 arrayed in a second direction perpendicular to the first direction. The bend sensors may be spaced from each other at certain intervals.

Although FIG. 3 illustrates that five bend sensors 21-1 to 21-5 and 22-1 to 22-5 are disposed in the longitudinal direction and in the lateral direction, respectively, the number of bend sensors is merely exemplary and may be changed according to a size, function, and the like of the flexible display apparatus. The bend sensors may be disposed in the longitudinal and lateral directions to detect the bending in the whole area of the flexible display apparatus. However, when the flexible display apparatus is partially flexible or detection of bending for a portion of the flexible display apparatus is necessary, the bend sensor may be disposed in a corresponding portion of the flexible display apparatus.

Each of the bend sensors 21-1 to 21-5 and 22-1 to 22-5 may be implemented with an electric resistance sensor using an electric resistance or a micro optical fiber sensor type using strain of an optical fiber. Hereinafter, for convenience of description, it is assumed and described that the bend sensor is implemented as the electric resistance sensor.

Specifically, as illustrated in FIG. 4, when a central region, which is disposed in a center of the display 110 on the basis of both left and right edges of the display 110 in the flexible display apparatus 100, is bent downward, tension due to the bending is applied to the bend sensor 21-1 to 21-5 disposed in a lateral direction. Accordingly, resistance values of the bend sensors 21-1 to 21-5 disposed in the lateral direction are changed. The sensor 120 senses change in the resistance value output from each of the bend sensors 21-1 to 21-5 to detect that bending is made in the lateral direction with respect to the center of the display surface. FIG. 4 illustrates in the state in which the central region is bent vertically in a downward direction (hereinafter, referred to as a Z− direction) with respect to the center of the display surface. However, even when the center region is bent vertically in an upward direction (hereinafter, referred to as a Z+ direction) with respect to the center of the display surface, the sensor 120 may detect the bending based on a change in an output value of each of the bend sensors 21-1 to 21-5 in the lateral direction.

As illustrated in FIG. 5, when a central region, which is disposed in a center of the display 110 on the basis of both top and bottom edges of the display 110 in the flexible display apparatus 100, is bent upward, tension due to the bending is applied to the bend sensor 22-1 to 22-5 disposed in a longitudinal direction. The sensor 120 may detect shape transformation in the longitudinal direction based on output values of the bend sensor 22-1 to 22-5 disposed in the longitudinal direction. FIG. 5 illustrates the bending in the Z+ direction, but the bending in Z− direction may also be detected using the bend sensors 22-1 to 22-5 disposed in the longitudinal direction.

When shape transformation in a diagonal direction is made, tension is applied to all bend sensor disposed in the longitudinal and lateral directions and the sensor 120 may also detect shape transformation in the diagonal direction based on output values of the bend sensor disposed in the longitudinal and lateral directions.

Hereinafter, a specific method for detecting shape transformation such as general bending, folding, rolling, and the like using a bend sensor will be described.

Figure 6:
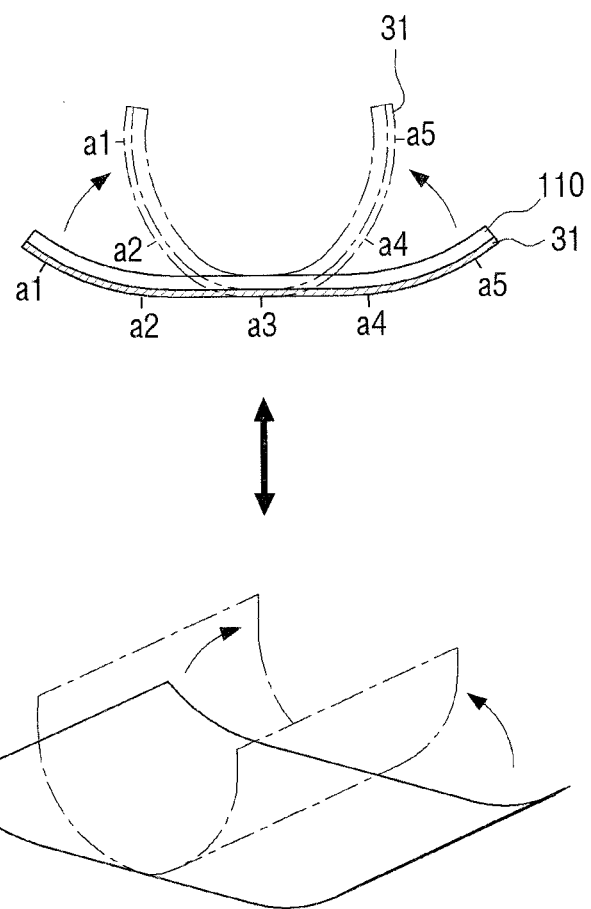
FIG. 6 is a view explaining a method of determining bending information according to an overall bending manipulation according to an embodiment of the present disclosure.

FIG. 6 is a view illustrating a method of determining bending information according to an overall bending manipulation according to an embodiment of the present disclosure.

FIG. 6 illustrates a cross-sectional view and a side view of a flexible display apparatus 100 when the flexible display apparatus is bent.

When the flexible display apparatus 100 is bent, bend sensors disposed on one surface or both surfaces of the flexible display apparatus 100 are also bent to have resistance values corresponding to an intensity of applied tension, and output values corresponding to the resistance values.

For example, as illustrated in FIG. 6, when the flexible display apparatus 100 is bent, a bend sensor 31 disposed on a rear surface of the flexible display apparatus 100 is also bent and outputs a resistance value according to an intensity of applied tension.

The intensity of the tension is proportional to a degree of the bending. For example, when the bending is made as illustrated in FIG. 6, the degree of bending in an edge region of the bent flexible display apparatus is the largest. Therefore, the greatest tension is applied to the bend sensor disposed in points a1 and a5, and thus the bend sensor 31 disposed in a region corresponding to the points a1 and a5 should have the largest resistance value.

The sensor 120 may determine that a region having an unchanged resistance value is a flat region in which the bending is not made, and a region in which a resistance value is changed more than a threshold as a bending region in which the bending is made at least a little.

Referring to FIG. 6, as the degree of bending is increased, the resistance values of the bend sensor 31 disposed in the point a1 and a5 are also increased, and resistance values of the bend sensor 31 disposed at points a2, a3, and a4 in which bending is made are also increased.

As illustrated in FIG. 6, when a full bending is made, a value of a radius R of curvature due to the bending is increased as the degree of bending is increased.

Figure 7:
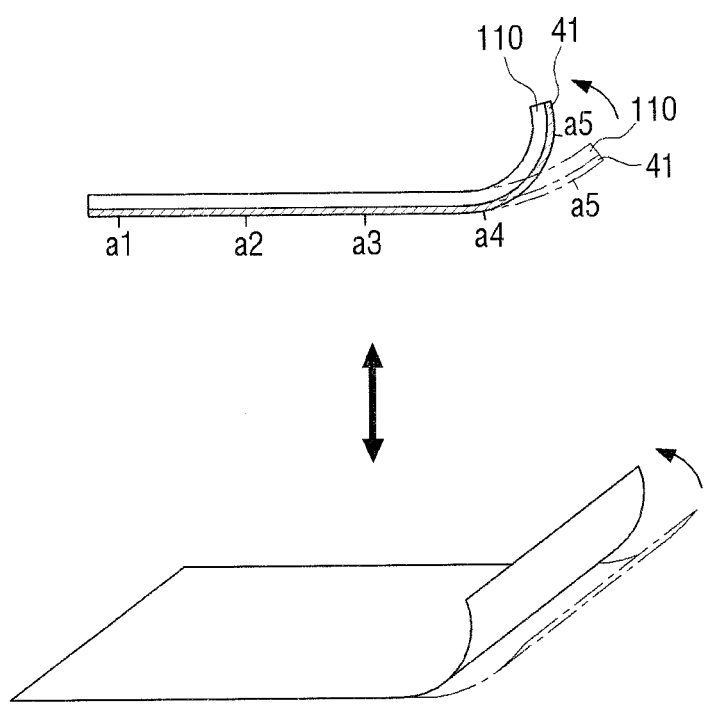
FIG. 7 is a view explaining a method of determining a degree of bending according to a partial bending manipulation according to an embodiment of the present disclosure.

FIG. 7 is a view illustrating a method of determining a degree of bending according to a partial bending manipulation according to an embodiment of the present disclosure.

Referring to FIG. 7, the flexible display apparatus 100 determines a degree of bending, that is, a bending angle using a change of the resistance values output from the bend sensor at every certain interval.

Specifically, the controller 130 calculates a difference between a resistance value at a point from which the largest resistance value is output in the bend sensor and a resistance value output from a point spaced from the point by a predetermined distance.

The controller 130 may determine the degree of bending using the calculated difference between the resistance values. Specifically, the flexible display apparatus 100 may divide the degree of bending into a plurality of levels, match resistance values having a certain range to thee plurality of levels, and store a matching result.

Accordingly, the flexible display apparatus 100 may determine the degree of bending of the flexible display apparatus 100 according to the calculated difference of the resistance values among the plurality of levels divided according to the degree of bending.

For example, as illustrated in FIG. 7, the controller may determine the degree of bending based on a difference between a resistance value output at a point a5, from which the largest resistance value is output in the bend sensor 41 that is provided in the rear surface of the flexible display apparatus 100, and a resistance value output at a point a4 that is spaced from the point a5 by a predetermined distance.

Specifically, the controller may check a level corresponding to the difference of the resistance value calculated in the embodiment illustrated in FIG. 7 among a plurality of prestored levels, and determine the degree of bending corresponding to the checked level. Here, the degree of bending may be expressed as a bending angle or a force of bending.

As illustrated in FIG. 7, when the degree of bending is increased, the difference between the resistance value output at the point a5 of the bend sensor and the resistance value output at the point a4 is increased. Accordingly, the controller 130 may determine that the degree of bending increases.

As described above, the bending direction of the flexible display apparatus 100 may be changed in the Z+ direction or the Z− direction.

The bending direction may also be detected through various methods. In an embodiment, the controller may determine the bending direction according to a difference of change in the levels of resistance values of two bend sensors by overlapping the two bend sensors.

Figure 8:
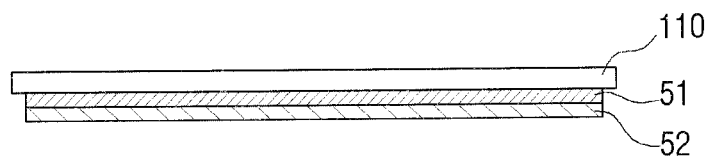
FIGS. 8, 9, and 10 are views explaining methods of detecting a bending direction using two bend sensors according to various embodiments of the present disclosure.
Figure 9:
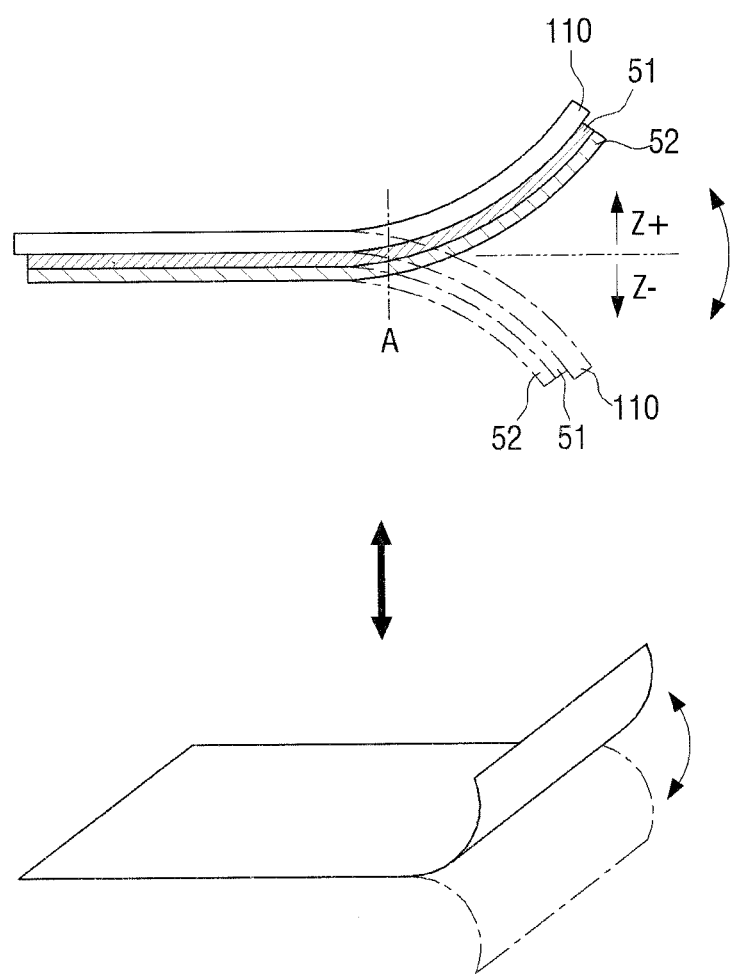
Figure 10:
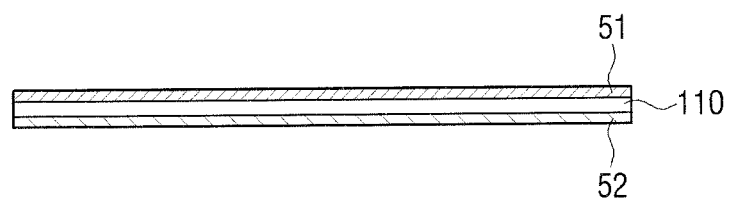

FIGS. 8, 9, and 10 are views explaining methods of detecting a bending direction using two bend sensors according to various embodiments of the present disclosure.

Referring to FIG. 8, two bend sensors 51 and 52 are provided in one surface of a display 110 to overlap each other. When bending is made in one direction, resistance values of an upper bend sensor 51 and a lower bend sensor 52 at a point in which the bending is made are detected differently. Accordingly, when the resistance values of the two bend sensors 51 and 52 at the same point are compared with each other, the bending direction may be determined.

Referring to FIG. 9, when the flexible display apparatus 100 is bent to the Z+ direction, tension having a larger intensity is applied to the lower bend sensor 52 rather than the upper bend sensor 51 at a point A corresponding to a bending line.

In contrast, when the flexible display apparatus 100 is bent to the Z− direction, tension having a larger intensity is applied to the upper bend sensor 51 rather than the lower bend sensor 52.

Therefore, the controller 130 may detect the bending direction by comparing resistance values of the two bend sensors 51 and 52 at the point A.

FIGS. 8 and 9 illustrate the state in which two bend sensor are disposed in one surface of the display 110 to overlap each other, the bend sensors may be disposed in both surfaces of the display 110 according to various embodiments of the present disclosure.

Referring to FIG. 10, two bend sensors 51 and 52 are disposed on opposing surfaces of a display 110.

When the flexible display apparatus 100 is bent to a first direction (hereinafter, referred to as a Z+ direction) perpendicular to a screen, while a bend sensor disposed in a first surface of the both surfaces receives compressive force, a bend sensor disposed in a second surface receives tension. On the other hand, when the flexible display apparatus 100 is bent to a second direction (hereinafter, referred to as a Z− direction) opposite the first direction, while the bend sensor disposed in the second surface of the both surfaces receives compressive force, the bend sensor disposed in the first surface receives tension. The resistance values sensed in the two bend sensors according to the bending direction are different, and the controller 130 may classify the bending direction according to the sensed resistance values.

It has been described in FIGS. 8, 9, and 10 that the bending direction is detected using the two bend sensors, and the bending direction may be classified using a strain gauge disposed in one or more surfaces of the display 110. That is, since pressure force or tensile stress is applied to the strain gauge disposed in one surface according to the bending direction, the bending may be determined through an output value of the strain gauge.

Figure 11:
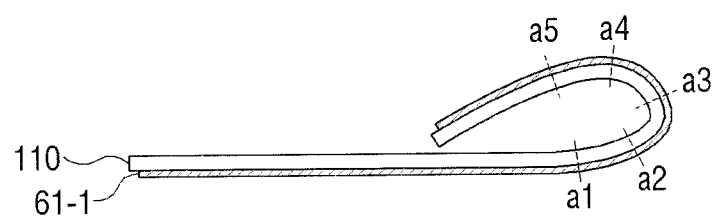
FIGS. 11 and 12 are views illustrating a method of detecting a folding state of a flexible display apparatus according to various embodiments of the present disclosure.
Figure 12:
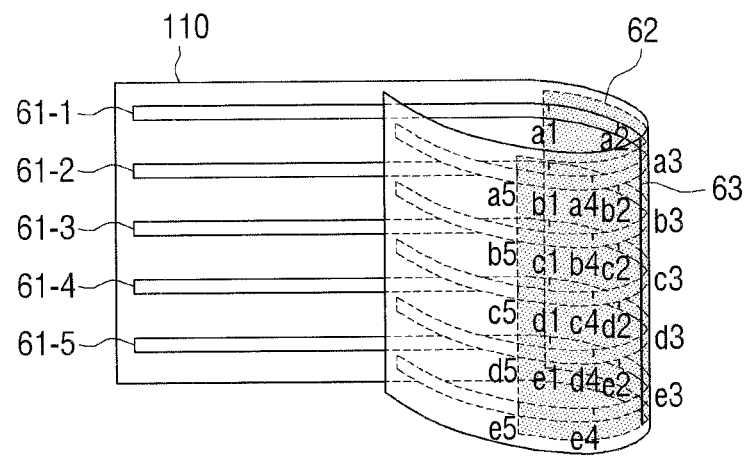

FIGS. 11 and 12 are views illustrating a method of detecting a folding state of a flexible display apparatus according to various embodiments of the present disclosure.

Referring to FIG. 11, a cross-sectional view illustrates when a partial region of a flexible display apparatus 100 is folded.

When the flexible display apparatus 100 is folded, a bend sensor disposed on one surface or both surfaces of the flexible display apparatus 100 is also bent, and has resistance values corresponding to an intensity of tension applied thereto.

For example, as illustrated in FIG. 11, when the flexible display apparatus 100 is folded in a form in which a right edge region thereof is bent toward the center thereof, a bend sensor 61-1 disposed in a rear surface of the flexible display apparatus 100 is also bent and outputs a resistance value according to an intensity of the applied tension.

In this bending, the bending sensor 61-1 has the largest resistance value at a point a3 in which the intensity of the applied tension is the largest, and the resistance value of the bending sensor 61-1 is reduced toward both side directions. That is, the resistances value of the bending sensor 61-1 is reduced toward points a2 and a1 or toward points a4 and a5 with respect to the point a3.

When the folding in which the flexible display apparatus 100 is bent over a certain bending angle, a resistance of over a threshold is sensed at a point corresponding to a bending line. Therefore, the controller 130 may determine the folding or the general bending according to the resistance value.

When bending is possible so that surfaces of the flexible display apparatus 100 are to be contact with each other, the controller 130 may determine the folding by considering whether or not the contact is made. That is, as illustrated in FIG. 11, when a right edge of the flexible display apparatus 100 is bent in the Z+ direction and folded to a front surface, regions spaced from each other of the front surface of the flexible display apparatus 100 is folded. At this time, a contact in one region of a display surface is sensed and a degree of change in the resistance value is larger than that in the general bending. Accordingly, the controller 130 may calculate a distance from an edge boundary in which the bending is made to a bending line, and determine that the folding is made when a touch is sensed at a point spaced to an opposite direction by the calculated distance on the basis of a bending line.

Referring to FIG. 12, the flexible display apparatus is folded in a lateral direction on the basis the front surface thereof, and thus for the convenience of description, bend sensors disposed in a longitudinal direction are not illustrated.

The folding region is a bent region formed according to folding of the flexible display apparatus and may be referred to as regions including all points of a bend sensor that output resistance values different from an original state.

The folding line is a region having the smallest radius of curvature in a portion of the folding region, and may be referred to as a line to connect points of which each outputs the largest resistance value.

The method of defining and dividing the folding region and folding line is the same as the method of defining and dividing the bending region and the bending line, and thus repeated description thereof will be omitted.

Referring to FIG. 12, a region 62 including all points having output resistance values different from that in the original state, that is, from a point a1 to a point a5 in the bend sensor 61-1, from a point b1 to a point b5 in the bend sensor 61-2, from a point c1 to a point c5 in the bend sensor 61-3, from a point d1 to a point d5 in the bend sensor 61-4, and from a point e1 to a point e5 in the bend sensor 61-5 may be referred to as one folding region.

The folding region is divided into two folding regions on the basis of a folding line. The folding line may be referred to as a line connecting points having the largest resistance values in the folding region.

In FIG. 12, a line 63 connecting a point a3 outputting the largest resistance value in the bend sensor 61-1, a point b3 outputting the largest resistance value in the bend sensor 61-2, a point c3 outputting the largest resistance value in the bend sensor 61-3, a point d3 outputting the largest resistance value in the bend sensor 61-4, and a point e3 outputting the largest resistance value in the bend sensor 61-5 is determined to be a folding line.

When the folding is detected, the controller 130 may perform various functions according to various embodiments and the operation of the controller 130 will be described later with reference to the accompanying drawings.

Even when a full region of the flexible display apparatus 100 is folded, the controller may determine the folding as the same method as the methods described in FIGS. 11 and 12, and thus detailed description thereof will be omitted.

As described above, the flexible display apparatus 100 may be rolled like a paper. The controller 130 may determine whether or not the rolling is made using a result sensed in the sensor 120.

Figure 13:
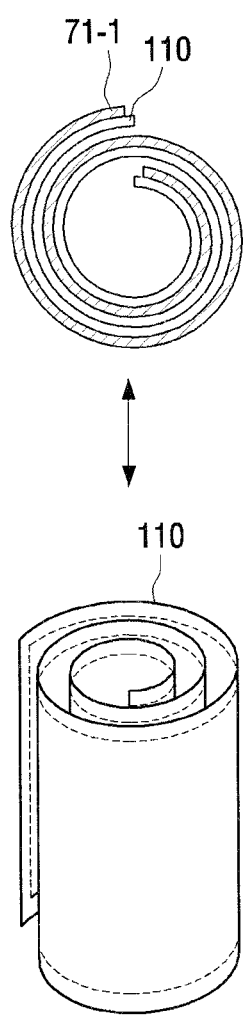
FIG. 13 is a view explaining a method of detecting rolling of a flexible display apparatus according to an embodiment of the present disclosure.

FIG. 13 is a view explaining a method of detecting rolling in a flexible display apparatus according to an embodiment of the present disclosure.

First, FIG. 13 illustrates a cross-sectional view when the flexible display apparatus 100 is rolled.

Similar to the above-described manner, when the flexible display apparatus 100 is rolled, tension is applied to bend sensors disposed in one surface or both surfaces of the flexible display apparatus.

Since an intensity of the tension applied to the bend sensors may be regarded to be approximate in a certain range, resistance values output the bend sensors are also approximate in a certain range.

The bending has to be made over a certain radius of curvature to determine a rolling. When the rolling is made, a bending region in the rolling is formed to be larger than those in the general bending or folding. Accordingly, when the controller 130 detects that the bending of over a certain bending angle is continuously made in a region of over a certain region, the controller may determine the bending as a rolling state. In the rolling state, a front surface and a rear surface of the display 110 of the flexible display apparatus are in contact with each other. For example, as illustrated in FIG. 13, when the display 110 is bent in the Z+ direction to be rolled inwardly toward a display surface, the display surface, that is, the front side and the rear side in which a bend sensor 71-1 is disposed contact with each other.

Accordingly, in the above-described other embodiment, the controller 130 may determine the rolling state according to whether or not the front side and the rear side of the flexible display apparatus are in contact with each other. At this time, the sensor 120 may include a touch sensor. The controller 130 may also determine that the flexible display apparatus is rolled when the resistance values output from the bend sensors are approximate in a certain range, and contact is sensed in touch sensors disposed in the front side and the rear side of the flexible display apparatus. The controller 130 may determine whether the flexible display apparatus is bent and partial regions of the flexible display apparatus are in contact with or close to each other using a magnetic field sensor, an optical sensor, a proximity sensor, or the like other than the touch sensor.

Figure 14:
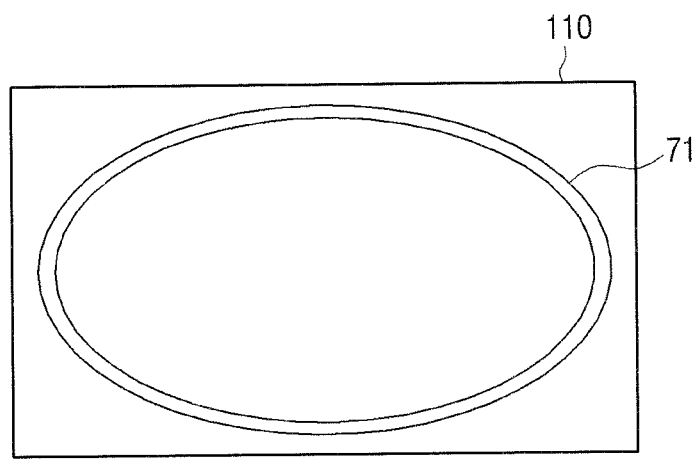
FIG. 14 is a view illustrating an example of a configuration for detecting bending by disposing one bend sensor on one surface of a display according to various embodiments of the present disclosure.

FIG. 14 is a view illustrating an example of a configuration for detecting bending by disposing on one surface of a display according to various embodiments of the present disclosure.

Referring to FIG. 14, a bend sensor 71 may be implemented in a closed curve type forming a circular shape, a tetragonal shape, or another polygonal shape, and disposed in an edge of the display 110. The controller 130 may determine a point in which change in an output value is sensed on the closed curve as a bending region. Further, the bend sensor may be implemented in an open curve type such as an S-shape, a Z-shape, or another zigzag shape, and combined with the display 110.

Figure 15:
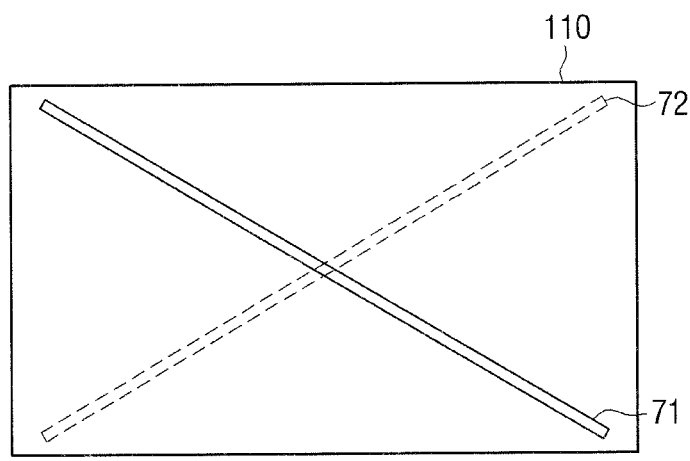
FIG. 15 is a view illustrating a display in which two bend sensors are disposed to cross each other according to an embodiment of the present disclosure.

FIG. 15 illustrating a display in which two bend sensors are disposed to cross each other according to an embodiment of the present disclosure.

Referring to FIG. 15, a first bend sensor 71 is disposed on a first surface of a display 110 and a second bend sensor 72 is disposed in a second surface of the display 110. The first bend sensor 71 is disposed on the first surface of the display 110 in a first diagonal direction and the second bend sensor 72 is disposed on the second surface in a second diagonal direction. Therefore, output values and output locations of the first bend sensor 71 and the second bend sensor 72 are changed according to various bending conditions such as a case in which each corner is bent, a case in which each edge region is bent, a central portion is bent, or a case in which folding or rolling is made. The controller 130 may determine which type of bending is made according to an attribute of the output value.

Although the above-described embodiments have illustrated that line-shaped bend sensors are used, a plurality of fractional strain gauges may be used to detect the bending.

Figure 16:
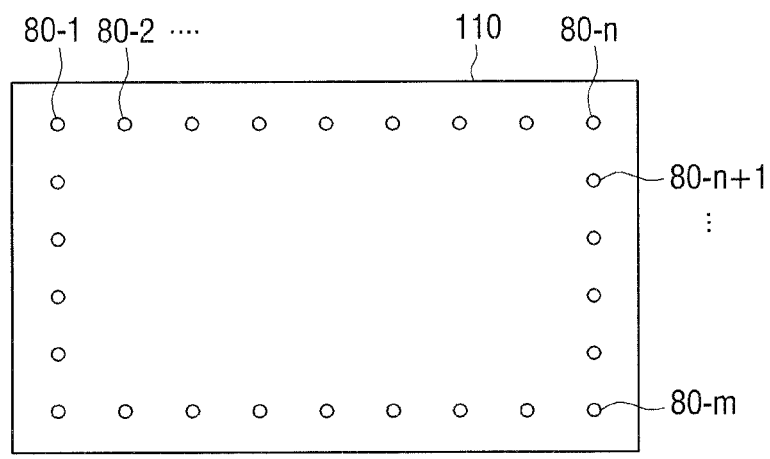
FIG. 16 is a view explaining a method of detecting bending using a plurality of strain gages according to an embodiment of the present disclosure.

FIG. 16 is a view explaining a method of detecting bending using a plurality of strain gauges according to an embodiment of the present disclosure.

The strain gauge detects deformation of a surface of a target object according to a change in a resistance value thereof using a metal or a semiconductor of which resistance is largely changed according to applied force. In general, a material such as a metal has a property in which a resistance value is increased when a length of the material is increased according to an external force and the resistance value is reduced when the length thereof is reduced. Therefore, the strain gauges may detect the change in the resistance value whether or not a bending is made.

Referring to FIG. 16, a plurality of strain gauges 80-1 to 80-n and 80-n+1 to 80-m are disposed in an edge region of the display 110. The number of strain gauges may be changed according to a size and a shape of the display 110, preset bending sensing resolution, and the like.

In a state in which the plurality of strain gauges are disposed as illustrated in FIG. 16, the user may allow an arbitrary point of the display 110 to be bent to an arbitrary direction. Specifically, when one corner region is bent, force is applied to a strain gauge overlapping a bending line among the strain gauges 80-1 to 80-n disposed in a longitudinal direction. Thus, an output value of the strain gauge overlapping the bending line is increased more than output values of the other strain gauges. Further, force is applied to a strain gauge overlapping a bending line among the strain gauges 80-n, 80-n+1 to 80-m disposed in a longitudinal direction, and thus an output value of the strain gauge is changed. The controller 130 may determine a line connecting the two strain gauges of which the outputs are changed as a bending line.

The flexible display apparatus 100 may detect a bending direction using various sensors such as a gyro sensor, a geomagnetic sensor, or an acceleration sensor.

Figure 17:
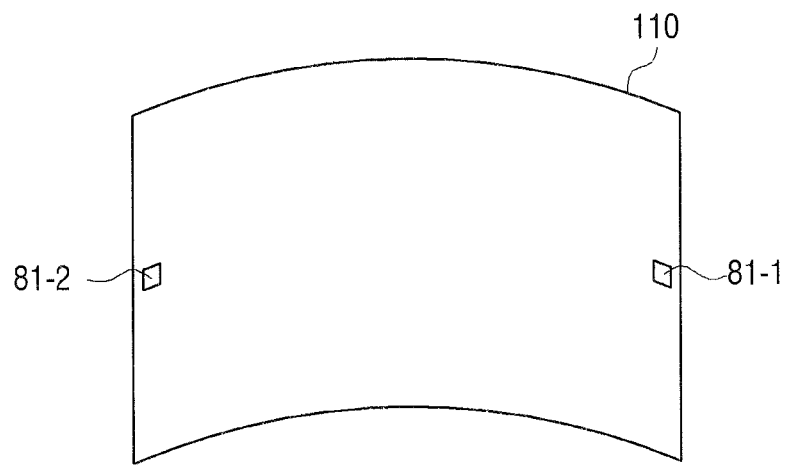
FIG. 17 is a view explaining a method of sensing a bending direction using an acceleration sensor according to an embodiment of the present disclosure.

FIG. 17 is a view explaining a method of sensing a bending direction using an acceleration sensor according to an embodiment of the present disclosure.

Referring to FIG. 17, the flexible display apparatus 100 includes a plurality of acceleration sensors 81-1 and 81-2.

The acceleration sensors 81-1 and 81-2 are sensors configured to measure acceleration and an acceleration direction when movement occurs. Specifically, the acceleration sensors 81-1 and 81-2 output sensing values corresponding to gravitational acceleration changed according to a slope of the apparatus to which the acceleration sensor is attached. When the acceleration sensors 81-1 and 81-2 are disposed in edge regions of the flexible display apparatus, the output values sensed in the acceleration sensors 81-1 and 81-2 are changed when the flexible display apparatus is bent. The controller 130 calculates a pitch angle and a roll angle using the output values sensed in the acceleration sensors 81-1 and 81-2. Thus, the controller 130 may determine the bending direction based on the pitch angle and roll angle sensed in the acceleration sensors 81-1 and 81-2.

Although the flexible display apparatus 100 in which the acceleration sensors 81-1 and 81-2 are disposed in the both edge regions in the lateral direction on the basis of a front surface thereof in FIG. 17, the acceleration sensors 81-1 and 81-2 may be disposed in the longitudinal direction. When the flexible display apparatus 100 is bent to the longitudinal direction in the state in which the acceleration sensors are disposed in the longitudinal direction, the flexible display apparatus 100 may detect the bending direction according to measurement values sensed in the acceleration sensors 81-1 and 81-2 disposed in the longitudinal direction.

According to another embodiment, the acceleration sensors may be disposed in all the edge regions in the lateral and longitudinal directions, or may be disposed at corner regions of the flexible display apparatus.

As described above, the bending direction may be detected using a gyro sensor or a geomagnetic sensor in addition to the acceleration sensor. The gyro sensor is a sensor configured to detect angular velocity by measuring the Coriolis force applied to a rotation direction when a rotational motion occurs. A rotation direction of the gyro sensor may be detected according to the measurement value of the gyro sensor and thus the bending direction may be detected. The geomagnetic sensor is configured to sense an azimuth angle using two-axes or three axes fluxgates. When the sensor for detecting the bending is implemented as a geomagnetic sensor, the location of the geomagnetic sensor disposed in each edge region of the flexible display apparatus 100 moves when the bending in the edge region is made, and thus the geomagnetic sensor outputs an electrical signal corresponding to change in geomagnetism due to the movement. The controller 130 may calculate a yaw angle using the output value of the geomagnetic sensor. Therefore, the flexible display apparatus 100 may determine various bending attributes such as the bending region and the bending direction according to change in calculated yaw angle.

As described above, the flexible display apparatus 100 may detect bending using various types of sensors. The configurations and sensing methods of the above-described sensors may be separately applied to the flexible display apparatus 100 or may be combined and applied to the flexible display apparatus 100.

The sensor 120 may also detect a manipulation in which the user touches a screen of the display 110 in addition to the bending. For example, the sensor may include a transparent conductive film such as ITO deposited on the substrate 111 of the display 110 and a film formed on the transparent conductive film. Therefore, when the user touches the screen, upper and lower plates at the touched point are in contact with each other and an electrical signal is transferred to the controller 130. The controller 130 recognizes the touched point using a coordinate of the electrode to which the electrical signal is transferred. The touch sensing method has been known in various cited references, and thus specific description thereof will be omitted.

<Example of Detailed Configuration of Flexible Display Apparatus According to Various Embodiments>

Figure 18:
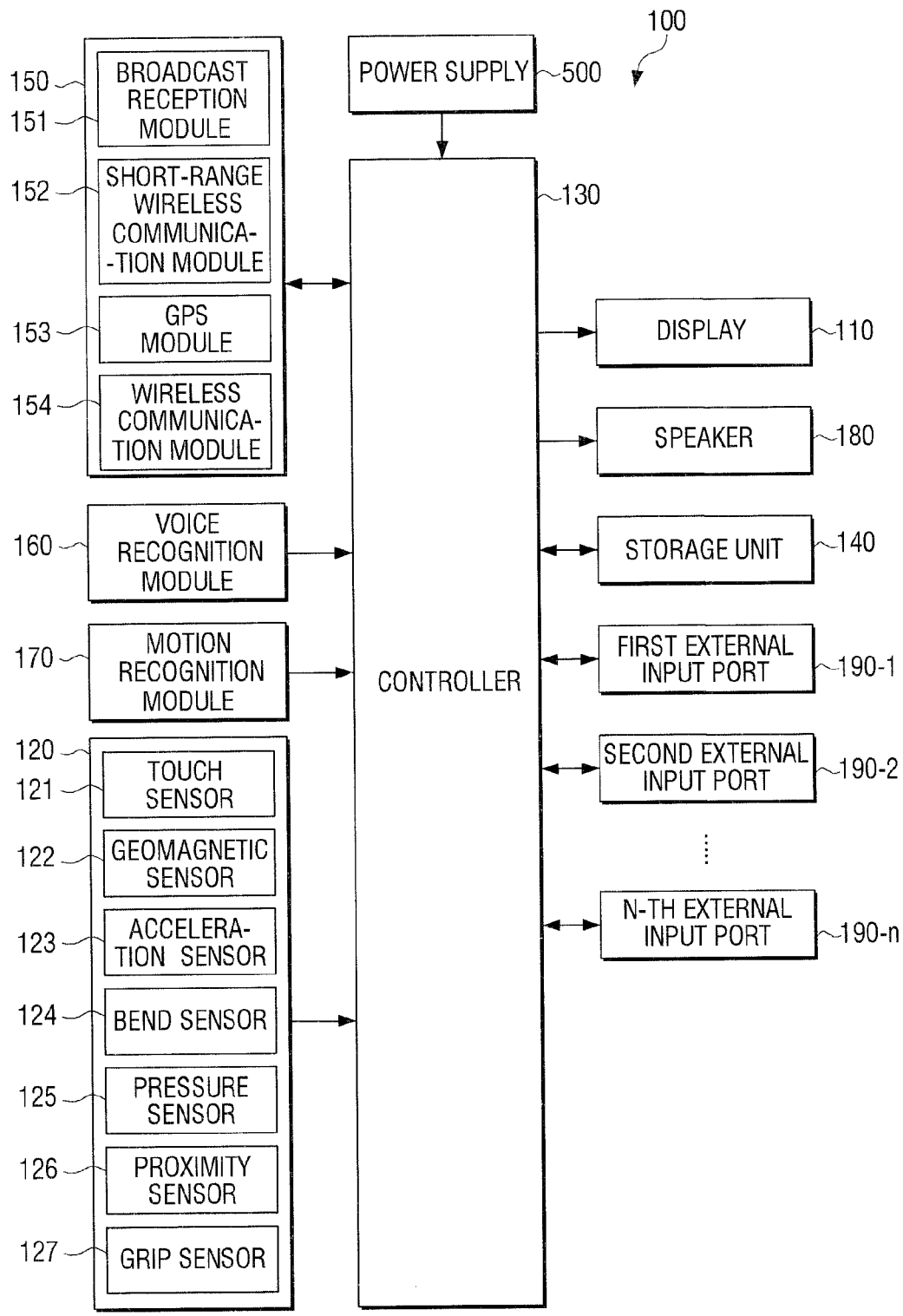
FIG. 18 is a block diagram of a flexible display apparatus according to various embodiments of the present disclosure.

FIG. 18 is a block diagram of a flexible display apparatus according to various embodiments of the present disclosure.

Referring to FIG. 18, the flexible display apparatus 100 includes a display 110, a sensor 120, a controller 130, a storage unit 140, a communication unit 150, a voice recognition unit 160, a motion recognition unit 170, a speaker 180, external input ports 190-1 to 190-n, and a power supply 500.

The display 110 has a flexible property. A detailed configuration and operation of the display 110 have been specifically described above, and repeated description thereof will be omitted.

The storage unit 140 may store a variety of programs or data related to an operation of the flexible display apparatus 100, setting information set by the user, system operating software, a variety of application programs, information for functions corresponding content of a user' manipulation, and the like.

The sensor unit 120 senses an overall manipulation state of the flexible display apparatus 100 including the display 110, for example, a bending state, a touch state, and the like. Referring to FIG. 18, the sensor 120 may include various types of sensors, such as a touch sensor 121, a geomagnetic sensor 122, an acceleration sensor 123, a bend sensor 124, a pressure sensor 125, a proximity sensor 126, and a grip sensor 127.

The touch sensor 121 may be implemented as a capacitive type or a resistive type. The capacitive type sensor is configured to calculate a touch coordinate by sensing a microcurrent excited to a body of the user when a portion of the body of the user touches a dielectric coated on a surface of the display 110. The resistive type sensor is configured to include two electrode plates and calculate a touch coordinate by sensing current flowing through contact between the upper and the lower electrode plates at a touched point when the user touches the screen. As described above, the touch sensor 121 may be implemented by various types.

The geomagnetic sensor 122 is configured to sense a rotation state and a moving direction of the flexible display apparatus 100. The acceleration sensor 123 is configured to sense a degree of tilt of the flexible display apparatus 100. As described above, the geomagnetic sensor 122 and the acceleration sensor 123 may be used to detect a bending attribute such as a bending direction or a bending region of the flexible display apparatus 110. In addition, the geomagnetic sensor 122 and the acceleration sensor 123 may also be used to detect a rotation state and a tilting state of the flexible display apparatus 100.

The bend sensor 124 may be implemented in various types as described above to detect a bending state of the flexible display apparatus 100. Various examples of a configuration and an operation of the bend sensor 124 have been described above, and thus repeated description thereof will be omitted.

The pressure sensor 125 senses a magnitude of pressure applied to the flexible display apparatus 100 when the user performs a touch or bending manipulation and provides the sensed result to the controller 130. The pressure sensor 125 may include a piezo film configured to be embedded therein and output an electrical signal corresponding to the magnitude of the pressure. Although FIG. 18 illustrates that the pressure sensor 125 is separate from the touch sensor 121, when the touch sensor 121 is implemented as a resistive touch sensor, the resistive touch sensor may also function as the pressure sensor.

The proximity sensor 126 is a sensor configured to sense an approaching motion. The proximity sensor 126 may be implemented as various types of sensors such as a high-frequency oscillation type sensor configured to form a high-frequency magnetic field and sense current induced by an magnetic characteristic changed when an object approaches such as a magnetic type sensor using a magnet or a capacitive type sensor configured to sense a capacitance changed due to approaching object.

The grip sensor 127 is a sensor configured to be disposed in an edge or grip portion of the flexible display apparatus 100 separately from the pressure sensor 125, and sense grip of the user. The grip sensor 127 may be implemented as a pressure sensor or a touch sensor.

The controller 130 may analyze various signals sensed in the sensor 120, determine whether or not a bending-flap manipulation is generated, and perform an operation matching the bending-flap manipulation. As an example of an operation performed in the controller 130, the controller 130 may perform an operation of processing data acquired through communication with an external apparatus or data stored in the storage unit 140, and outputting a processing result through the display 110, the speaker 180, and the like. At this time, the controller 130 may perform communication with an external apparatus using the communication unit 150.

The communication unit 150 is configured to perform communication with various types of external apparatus according to various types of communication methods. The communication unit 150 may include various communication modules such as a broadcasting reception module 151, a short-range wireless communication module 152, a Global Positioning System (GPS) module 153, or a wireless communication module 154. Here, the broadcasting reception module 151 may include a terrestrial broadcasting reception module (not shown) including an antenna configured to receive a terrestrial broadcasting signal, a demodulator, an equalizer, and the like, a Digital Multimedia Broadcasting (DMB) module configured to receive and process a DMB broadcasting signal, and the like. The short-range communication module 152 is a communication module configured to perform communication with an external apparatus located in a short range according to a short-range wireless communication manner such as Near Field Communication (NFC), Bluetooth®, or Zigbee®. The GPS module 153 is a module configured to receive a GPS signal from a GPS satellite and to detect a current location of the flexible display apparatus 100. The wireless communication module 154 is a module configured to be connected to an external network and perform communication according to a wireless communication protocol, such as Wireless Fidelity (WI-FI), or any other Institute of Electrical and Electronics Engineers (IEEE) standard. In addition, the communication unit 150 may further include a mobile communication module configured to access to the mobile communication network and perform communication according to various mobile communication standards such as 3rd Generation (3G), 3rd Generation Partnership Project (3GPP), or Long Term Evolution (LTE).

The controller 130 selectively activates components required to execute a function corresponding to a folding manipulation by the user among the above-described components of the communication unit 150.

The controller 130 may recognize a voice input or a motion input and perform an operation corresponding to the input, in addition to the bending manipulation or the touch manipulation. At this time, the controller may activate the voice recognition unit 160 or the motion recognition unit 170.

The voice recognition unit 160 collects a user's voice or external sound using a voice acquisition unit such as a microphone (not shown) and transmits the collected sound to the controller 130. When the controller 130 operates in the voice control mode, the controller 130 may perform a task corresponding to the user's voice when the user's voice coincides with a preset voice command. Some example tasks that are controllable using the voice include volume adjustment, channel selection, channel zapping, display attribute control, play, pause, rewind, fast forward, application execution, menu selection, device turn-on, turn-off, and the like.

The motion recognition unit 170 acquires a user's image using an imaging unit (not shown) such as a camera and transmits the acquired image to the controller 130. When the controller 130 operates in the motion control mode, the controller 130 may analyze the user's image and perform an operation corresponding to the user's motion gesture when it is determined that the user's motion gesture coincides with a preset motion gesture. As an example, various tasks such as channel browsing, device turn-on, turn-off, pause, play, stop, rewind, fast forward, mute, and the like may be controlled by a motion. The examples of voice-controllable task, a motion-controllable task, and the like are merely exemplary, and are not limited thereto.

A first external input port 190-1 to an n-th external input port 190-n may be connected to various types of external apparatuses to receive a variety of data or programs, or control commands. Specifically, the external input ports may include a Universal Serial Bus (USB) port, a headset port, a mouse port, a Local Area Network (LAN) port, and the like. The power supply 500 is configured to supply power to components of the flexible display apparatus 100. The power supply 500 may be implemented in a form including an anode current collector, an anode, an electrolyte unit, a cathode, a cathode current collector, and a cover surrounding the components. The power supply 500 may be implemented as a rechargeable secondary battery. The power supply 500 may be implemented in a flexible form to be bent together with the flexible display apparatus 100. At this time, the current collector, the electrode part, the electrolyte, the cover, and the like may be formed of a material having a flexible property. A specific shape and a material of the power supply 500 will be described later.

Although FIG. 18 illustrates various components to be included in the flexible display apparatus 100, all components are not necessarily included in the flexible display apparatus 100. That is, according to a product type of the flexible display apparatus 100, some of the components may be omitted or replaced with other components, or other components may be added.

The controller 130 controls the respective components to perform various operations according to a user's manipulation recognized through the above-described sensor 120, voice recognition unit 160, the motion recognition unit, and the like.

Figure 19:
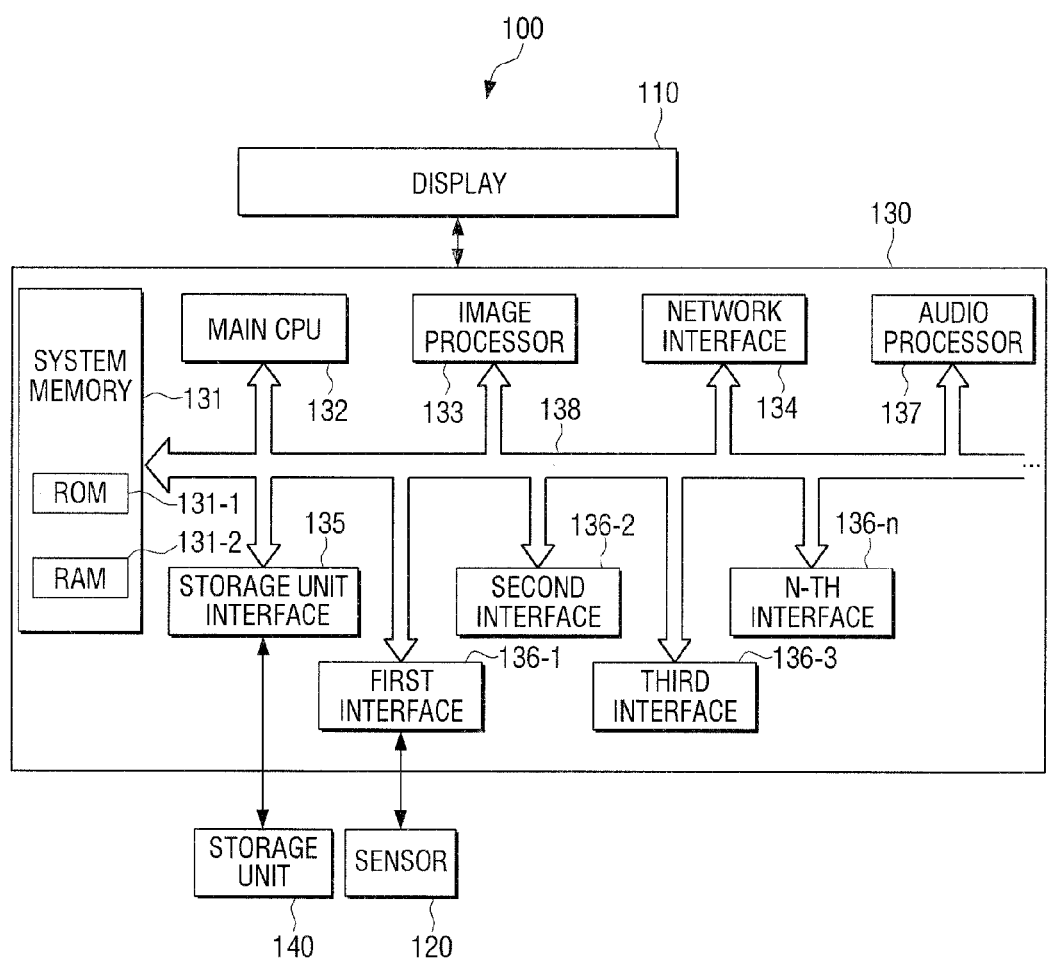
FIG. 19 is a block diagram of a controller according to an embodiment of the present disclosure.

FIG. 19 is a block diagram of a controller according to an embodiment of the present disclosure.

Referring to FIG. 19, the controller 130 includes a system memory 131, a main Central Processing Unit (CPU) 132, an image processor 133, a network interface 134, a storage unit interface 135, first to n-th interfaces 136-1 to 136-n, an audio processor 137, and a system bus 138.

The system memory 131, the main CPU 132, the image processor 133, the network interface 134, the storage unit interface 135, the first to n-th interfaces 136-1 to 136-n, and the audio processor 137 may be connected to each other through the system bus 138 and transmit/receive a variety of data or signals, and the like.

The first to n-th interfaces 136-1 to 136-n support interfacing between various components including the sensor 120 and other respective components connected to the controller 130. For example, FIG. 19 illustrates that the sensor 120 is connected only through the first interface 136-1. However, as illustrated in FIG. 18, when the sensor 120 includes various types of a plurality of sensors, the sensors may be connected through any suitable interface. One of the interfaces 136-1 to 136-n may be implemented as an input interface configured to receive various signals from buttons provided in a body portion of the flexible display apparatus 100 or external apparatuses connected through the first to n-th external input ports.

The system memory 131 includes a Read Only Memory (ROM) 131-1 and a Random Access Memory (RAM) 131-2. A command set, and the like for system booting may be stored in the ROM 131-1. When a turn-on command is input to supply power, the main CPU 132 copies the Operating System (O/S) stored in the storage unit 140 to the RAM 131-2 according to a command stored in the ROM 131-1, and executes the O/S to boot a system. When booting is completed, the main CPU 132 copies various application programs stored in the storage unit 140 to the RAM 131-2 and executes the application programs to perform various operations.

As described above, the main CPU 132 may perform various operations according to execution of the application programs stored in the storage unit 140.

The storage unit interface 135 is connected to the storage unit 140 to transmit and receive a variety of programs, content, and data.

As an example, when the user performs a touch manipulation or a bending manipulation corresponding to a reproduction command for reproducing and displaying content stored in the storage unit 140, the main CPU 132 accesses the storage unit 140 through the storage unit interface 135 to generate a list for the stored content and displays the list on the display 110. When the user performs a touch manipulation or a bending manipulation for selecting content, the main CPU 132 executes the content reproduction program stored in the storage unit 140. The main CPU 132 controls the image processor 133 to construct a content reproduction screen according to a command included in the content reproduction program.

The image processor 133 may include a decoder, renderer, a scaler, and the like. Thus, the image processor 133 performs decoding on stored content, performs rendering on decoded content data to construct a frame, and performs scaling on the frame so that a size of the constructed frame matches a screen size of the display 110. The image processor 133 provides the processed frame to the display 110 to be displayed.

Further, the audio processor 137 is configured to process audio data and provides the processed data to a sound output unit such as the speaker 180. The audio processor 137 may perform decoding audio data stored in the storage unit 140 or audio data received through the communication unit 150, perform noise filtering on the decoded data, and then perform audio signal processing such as amplification of the audio data to an appropriate volume. In the above-described exemplary embodiment, if the reproduced content is moving image content, the audio processor 137 may process audio data demultiplexed from the moving image content, and provide the processed data to the speaker 180 so that the processed data is synchronized with the output from the image processor 133.

The network interface 134 is configured to be connected to external apparatuses through a network. When a web browser program is executed, the main CPU 132 accesses a web server through the network interface 134. When web page data is received from the web server, the main CPU 132 controls the image processor 133 to construct a web page screen and displays the constructed web page screen in the display 110.

As described above, when it is determined that a bending-flap manipulation is generated in the flexible display apparatus 100, the main CPU reads information such as a function for an operation corresponding to the bending-flap manipulation from the storage unit 140 and performs an operation corresponding to the information. As described above, the operation of the controller 130 may be implemented by executing various programs stored in the storage unit 140.

Figure 20:
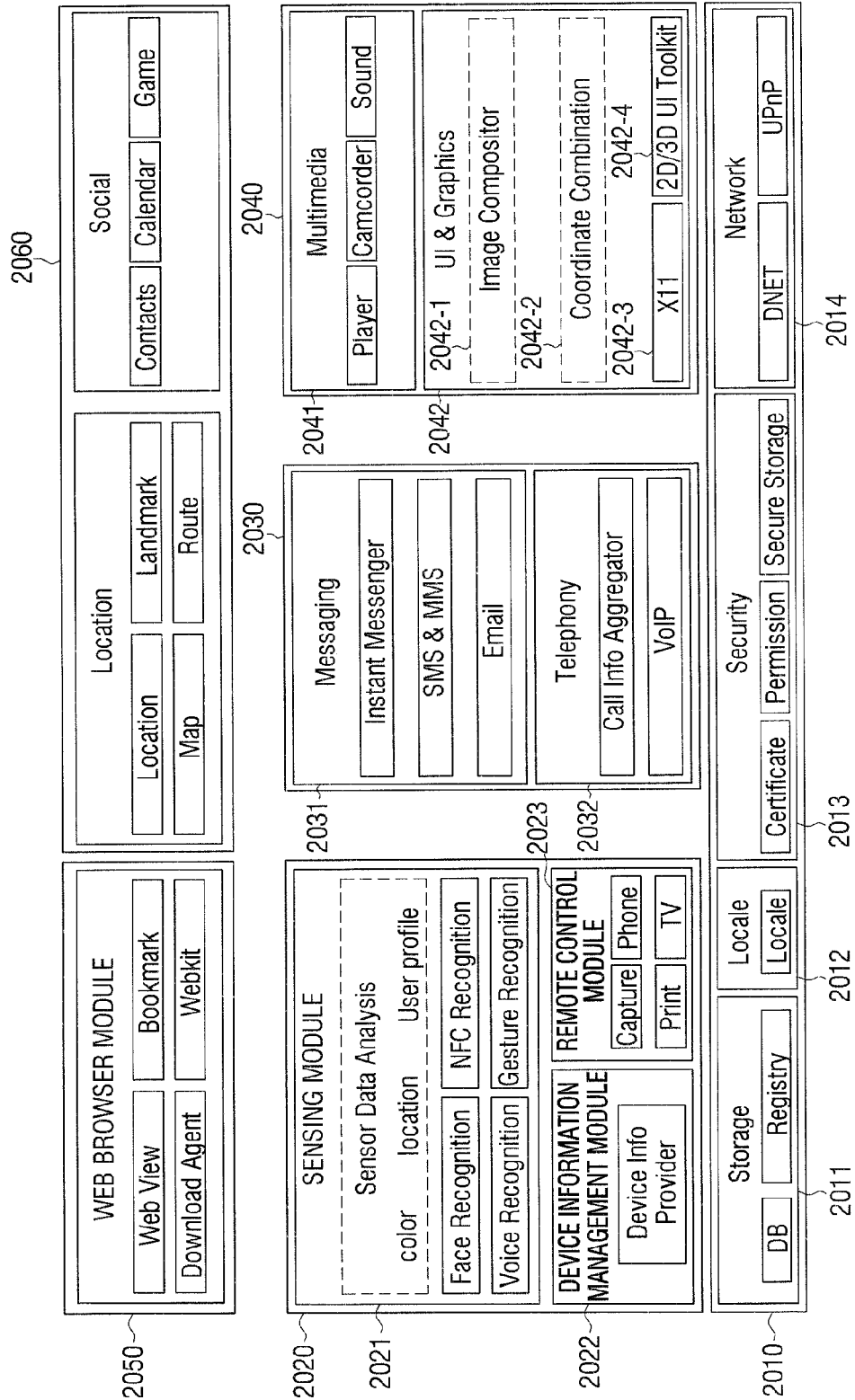
FIG. 20 is a block diagram of a software structure for supporting an operation of a controller according to the above-described embodiments of the present disclosure.

FIG. 20 is a block diagram of a software structure for supporting an operation of a controller according to the above-described various embodiments of the present disclosure.

Referring to FIG. 20, the software of storage unit 140 includes a base module 2010, a device management module 2020, a communication module 2030, a presentation module 2040, a web browser module 2050, and a service module 2060.

The base module 2010 is a basic module configured to process signals transmitted from hardware included in the flexible display apparatus 100 and transmit the processed signals to an upper layer module.

The base module 2010 includes a storage module 2011, a location-based module 2012, a security module 2013, a network module 2014, and the like.

The storage module 2011 is a program module configured to manage a database DB or a registry. The location-based module 2012 is a program module configured to support location-based services in connection with hardware such as a GPS chip. The security module 2013 is a program module configured to support certification to hardware, permission, secure storage, and the like, and the network module 2014 is a module configured to support network connection such as a Device Net (DNET) module, a Universal Plug and Play (UPnP) module, and the like.

The device management module 2020 is a module configured to manage and use information for an external input and an external apparatus. The device management module 2020 may include a sensing module 2021, a device information management module 2022, a remote control module 2023, and the like.

The sensing module 2021 is a module configured to analyze sensor data provided from various sensors in the sensor 120. Specifically, the sensing module 2021 is a program module configured to perform an operation of detecting a location of an object or a location, color, a shape, a size, and other profiles of the user. The sensing module 2021 may include a face recognition module, a voice recognition module, a motion recognition module, a NFC recognition module, and the like. The device information management module 2022 is a module configured to provide information for various devices. The remote control module 2023 is a program module configured to perform an operation of remotely controlling a peripheral device, such as a phone, a TV, a printer, a camera, or an air-conditioner.

The communication module 2030 is a module configured to perform communication with the other devices. The communication module 2030 may include a messaging module 2031, such as a messenger program module, a Short Message Service (SMS) & Multimedia Message Service (MMS) program module, and an E-mail program module, a call module 2032 including a call information aggregator program module, a Voice over Internet Protocol (VoIP) module, and the like.

The presentation module 2040 is a module configured to construct a display screen. The presentation module 2040 includes a multimedia module 2041 configured to reproduce and output multimedia content and a UI and graphics module 2042 configured to perform UI and graphics processing. The multimedia module 2041 may include a player module, a camcorder module, a sound processing module, and the like. Accordingly, the multimedia module 2041 performs a reproduction operation of reproducing a variety of multimedia content to generate a screen and a sound. The UI and graphics module 2042 may include an image compositor module 2042-1 configured to composite images, a coordinate combination module 2042-2 configured to combine and generate coordinates on a screen in which an image is to be displayed, an X11 module 2042-3 configured to receive various events from hardware, and a 2D/3D UI toolkit 2042-4 configured to provide a tool for forming a 2D type or 3D type UI. For example, the UI and graphics module 2042 may construct a UI screen corresponding to a size of the screen generated based on a bending.

The web browser module 2050 is a module configured to perform web browsing functions to access content stored on a web server. The web browser module 2050 may include various modules, such as a web view module configured to form a web page, a download agent module configured to perform download, a bookmark module, and a web kit module.

The service module 2060 is an application module configured to provide a variety of service. For example, the service module 2060 may include a navigation service module configured to provide a map, a current location, a landmark, path information, and the like, a game module, an advertising application module, and the like.

The main CPU 132 accesses the storage unit 140 through the storage unit interface 135, copies the various modules stored in the storage unit 140 to the RAM 131-2, and performs an operation according to an operation of copied modules.

Specifically, the main CPU 132 analyzes output values of the various sensors in the sensor 120 using the sensing module 2021, checks a bending region, a bending line, a bending direction, the number of bendings, a bending angle, a bending speed, a touch region, the number of touches, a touch strength, a magnitude of pressure, a degree of proximity, a user's grip, and the like, and determines whether or not a bending-flap manipulation is generated based on the result. When it is determined that the bending-flap manipulation is generated, the main CPU 132 detects information for a function corresponding to the bending-flap manipulation from a data base DB of a storage module 2010. The main CPU 132 drives a module corresponding to the detected information to perform an operation.

As an example, when the bending-flap manipulation corresponds to a Graphic User Interface (GUI) display operation, the main CPU 132 constructs a GUI screen corresponding to a size of the screen generated based on the bending using the image compositor module 2042-1 in the presentation module 2040. The main CPU 132 determines a display location of the GUI screen using the coordinate combination module 2042-2, and controls the display 110 to display the GUI screen in the determined location.

When the bending-flap manipulation corresponds to a message reception, the main CPU 132 executes the messaging module 2041 to access a message management server, and receives a message stored in a user account. The main CPU 132 constructs a screen corresponding to the received message to match the size of the screen generated based on the bending using the presentation module 2040 and displays the constructed screen in the display 110.

In addition, when the bending-flap manipulation corresponds to a call function, the main CPU 132 may execute the call module 2032.

As described above, the programs of various structures may have been stored in the storage unit 140, and the controller 130 may perform the operations according to the above-described embodiments using the various programs stored in the storage unit 140.

Figure 21:
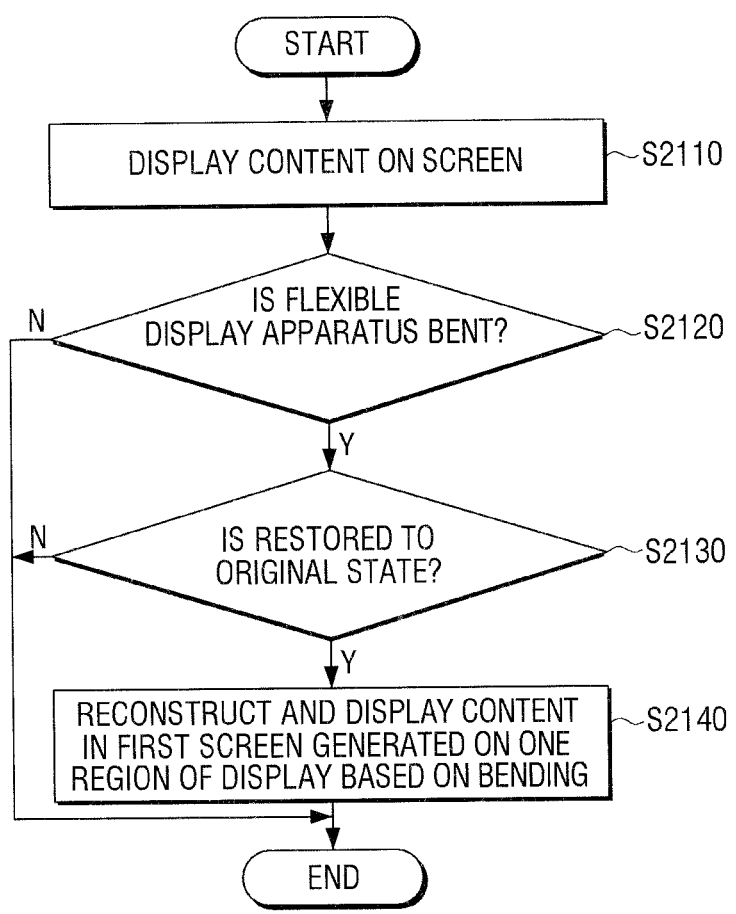
FIG. 21 is a flowchart illustrating a method of controlling a flexible display apparatus according to an embodiment of the present disclosure.

FIG. 21 is a flowchart illustrating a method of controlling a flexible display apparatus according to an embodiment of the present disclosure.

Referring to FIG. 21, the flexible display apparatus displays content on screen at operation S2110. Subsequently, the flexible display apparatus detects whether or not the flexible display apparatus is bent at operation S2120.

When it is determined that flexible display apparatus is bent at operation S2120 (S2120-Y), the flexible display apparatus determines whether or not the bending state is restored to an original state within a preset time range at operation S2130.

When it is determined that flexible display apparatus is restored to the original state in operation S2130 (S2130-Y), the flexible display apparatus reconstructs and displays content in a first screen generated on one region of display based on bending at operation S2140. Content displayed on the first screen may be displayed in a remaining region of the display. Here, the related content may be determined according to an attribute of the content displayed on the screen. For example, when the content displayed on the screen is an image, the related content may be a copied image, an edited image, and the like. When the content displayed on the screen is a web page, the related content may be a previous web page, a main web page, and the like.

Figure 22:
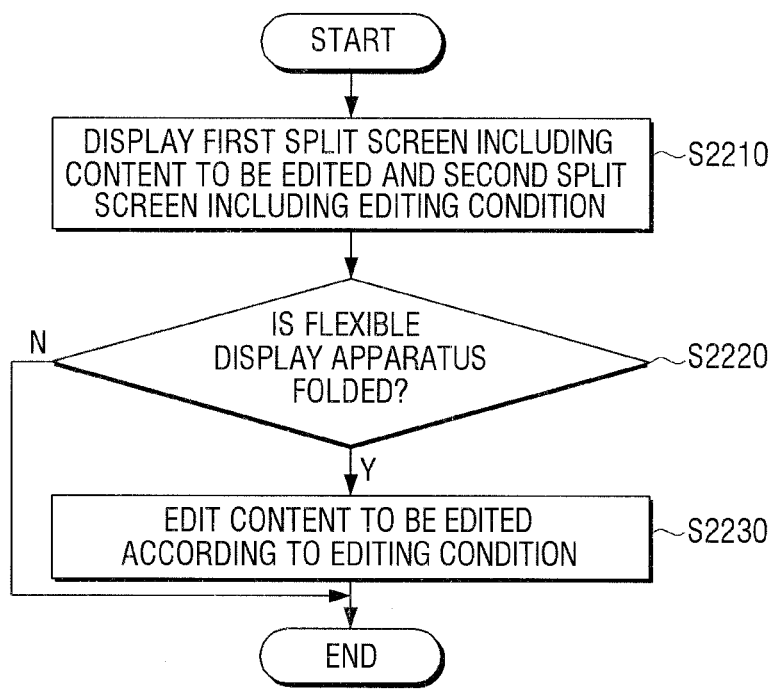
FIG. 22 is a flowchart illustrating a method of controlling a flexible display apparatus according to another embodiment of the present disclosure.

FIG. 22 is a flowchart illustrating a method of controlling a flexible display apparatus according to another embodiment of the present disclosure.

Referring to FIG. 22, the flexible display apparatus displays a first split screen including content to be edited and a second split screen including an editing condition according to a user command at operation S2210. Here, the content to be edited of the first split screen and the editing condition of the second split screen may be selected by various manipulations of the user such as a touch manipulation or a bending manipulation.

Subsequently, the flexible display apparatus determines if the flexible display apparatus is folded at operation S2220.

When it is determined that flexible display apparatus is folded in operation S2220 at operation S2220-Y, the flexible display apparatus edits the content to be edited displayed in the first split screen according to the editing condition displayed in the second split screen at operation S2230. The method will be described later with reference to the accompanying drawings.

Figure 23:
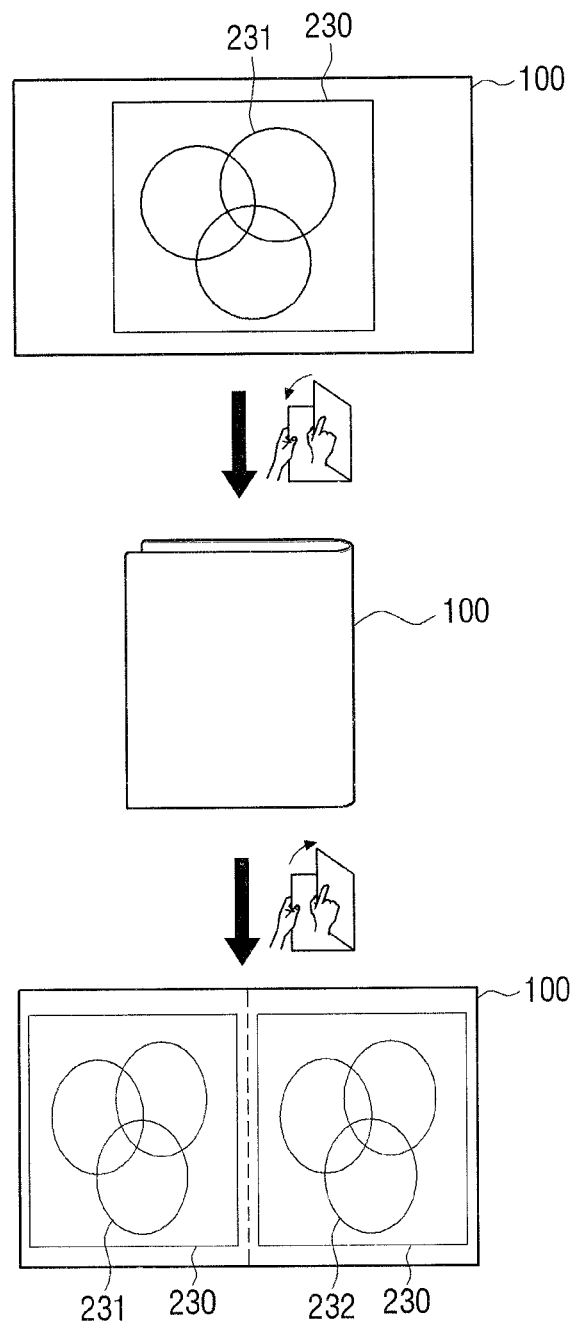
FIG. 23 is a view illustrating a method of providing a screen according to an embodiment of the present disclosure.

FIG. 23 is a view illustrating a screen providing method according to an embodiment of the present disclosure.

As illustrated in FIG. 23, it is assumed that the flexible display apparatus is folded in half in a state in which original content 231 provided through a specific program is displayed on an entire screen of the flexible display apparatus 100. Here, a program element 230 provided through the specific program may be displayed together with the original content. For example, when the original content is photo content and the photo content is provided through a photo application, a menu element provided in the photo application may be the program element.

When a folding and a folding releasing manipulation is performed, the original content 231 and the program element 230 may be displayed to match a screen size in one of screens split on the basis of a folding line, and copied content and the program element 230 may be displayed in the other split screen.

That is, according to an embodiment, all object elements displayed in the screen may be copied by the folding manipulation.

When a split screen is displayed, which moves relatively little in folding, among the split screens split on the basis of the folding line is referred to as a fixing part, and a split screen, which moves relatively largely, is referred to as a transformation part, the original content 231 may be displayed in the fixing part, and the copied content 232 may be displayed in the transformation part. However, this is merely exemplary, and the concept of the transformation part and the fixing part may not be applied to all embodiments. It may be previously set that original content is displayed in the left screen on the basis of the folding line, and transformed content such as the copied content is displayed in the right screen.

Figure 24:
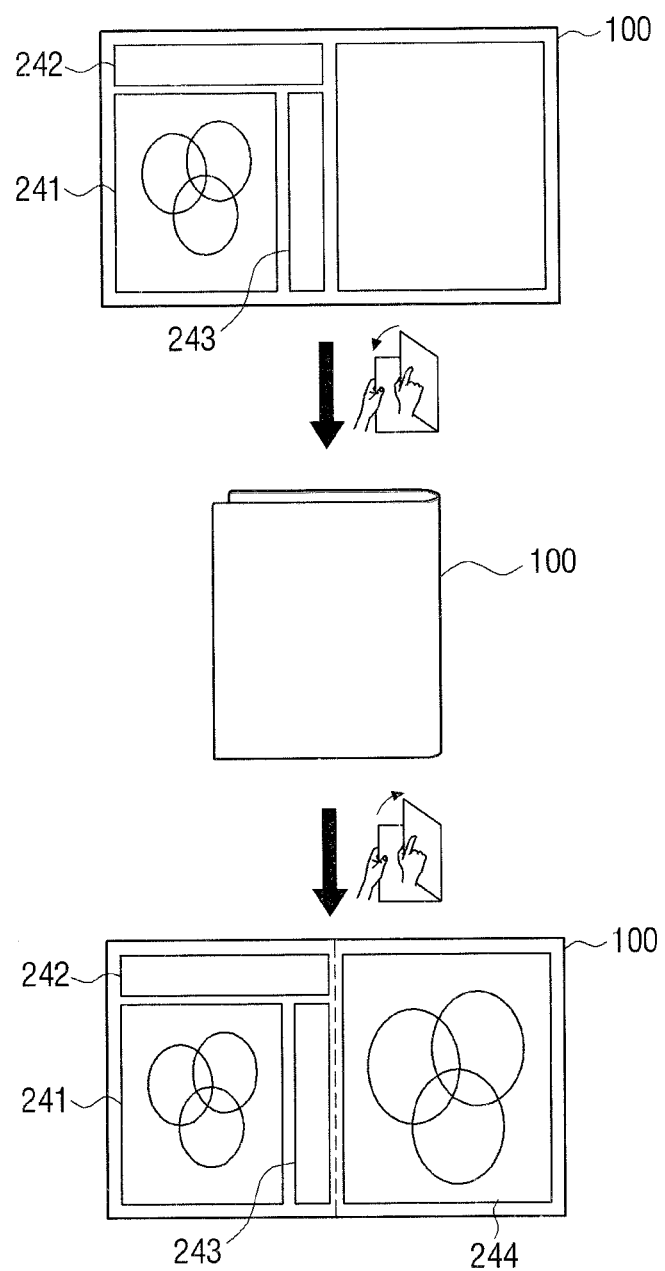
FIG. 24 is a view illustrating a method of providing a screen according to another embodiment of the present disclosure.

FIG. 24 is a view illustrating a method of providing a screen according to another embodiment of the present disclosure.

As illustrated in FIG. 24, it is assumed that the flexible display apparatus 100 is folded in half in a state in which original content 241 provided through a specific program is displayed on one region of a screen of the flexible display apparatus 100. Here, program elements 241 and 242 provided through the specific program may be displayed together with the original content.

When a folding and a folding releasing manipulation is performed, an original screen including the original content 241 and the program elements 241 and 242 may be displayed in one of screens split on the basis of a folding line, and only copied content 244 for the original content 241 included in the original screen may be displayed in the other split screen.

That is, according to an embodiment, only the content element among elements displayed in the screen may be copied by the folding manipulation. For example, only photo content is copied, and menu elements provided through a photo application are not copied.

FIGS. 25, 26, 27, 28, 29, 30, 31, 32, 33, 34, 35, 36, 37, 38, 39A and 39B are views illustrating methods of providing a screen according to various embodiments of the present disclosure.

Figure 25:
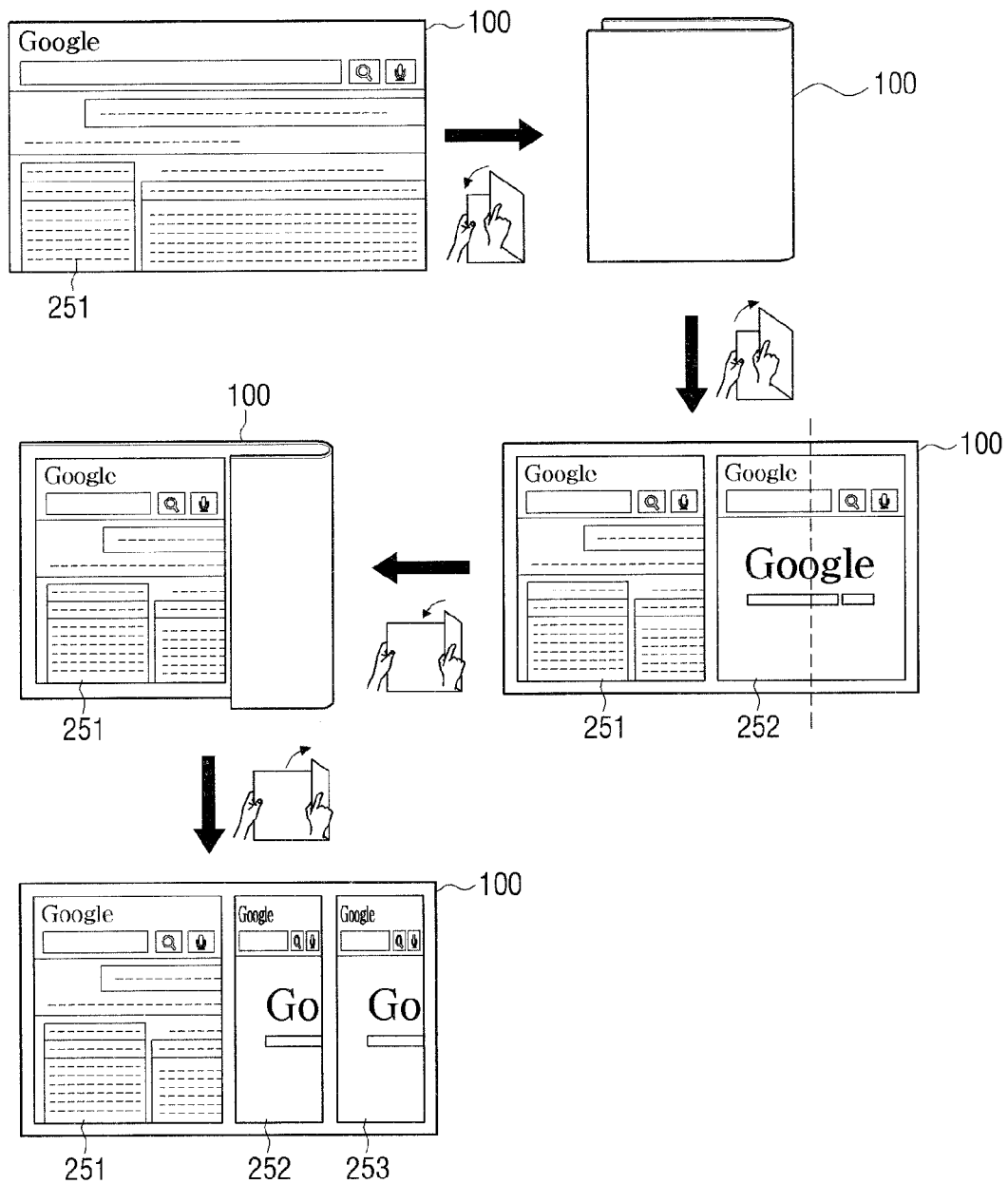
FIGS. 25, 26, 27, 28, 29, 30, 31, 32, 33, 34, 35, 36, 37, 38, 39A, and 39B are views illustrating methods of providing a screen according to various embodiments of the present disclosure.

Referring to FIG. 25, it is assumed that the flexible display apparatus 100 is folded in half in a state in which a web page 251 is displayed in a screen of the flexible display apparatus 100.

Subsequently, when a folding and a folding releasing manipulation is performed, the web page 251 displayed in the original screen may be displayed in one of screens split on the basis of a folding line, and a main web page 252 may be displayed in the other split screen.

When the region in which the main web page 252 is displayed is folded in half, the main web page 252 originally displayed on the basis of the folding line and a new main web page 253 may be displayed in split screens.

That is, a feedback effect in which a new web page window is displayed by a folding manipulation may be provided.

Figure 26:
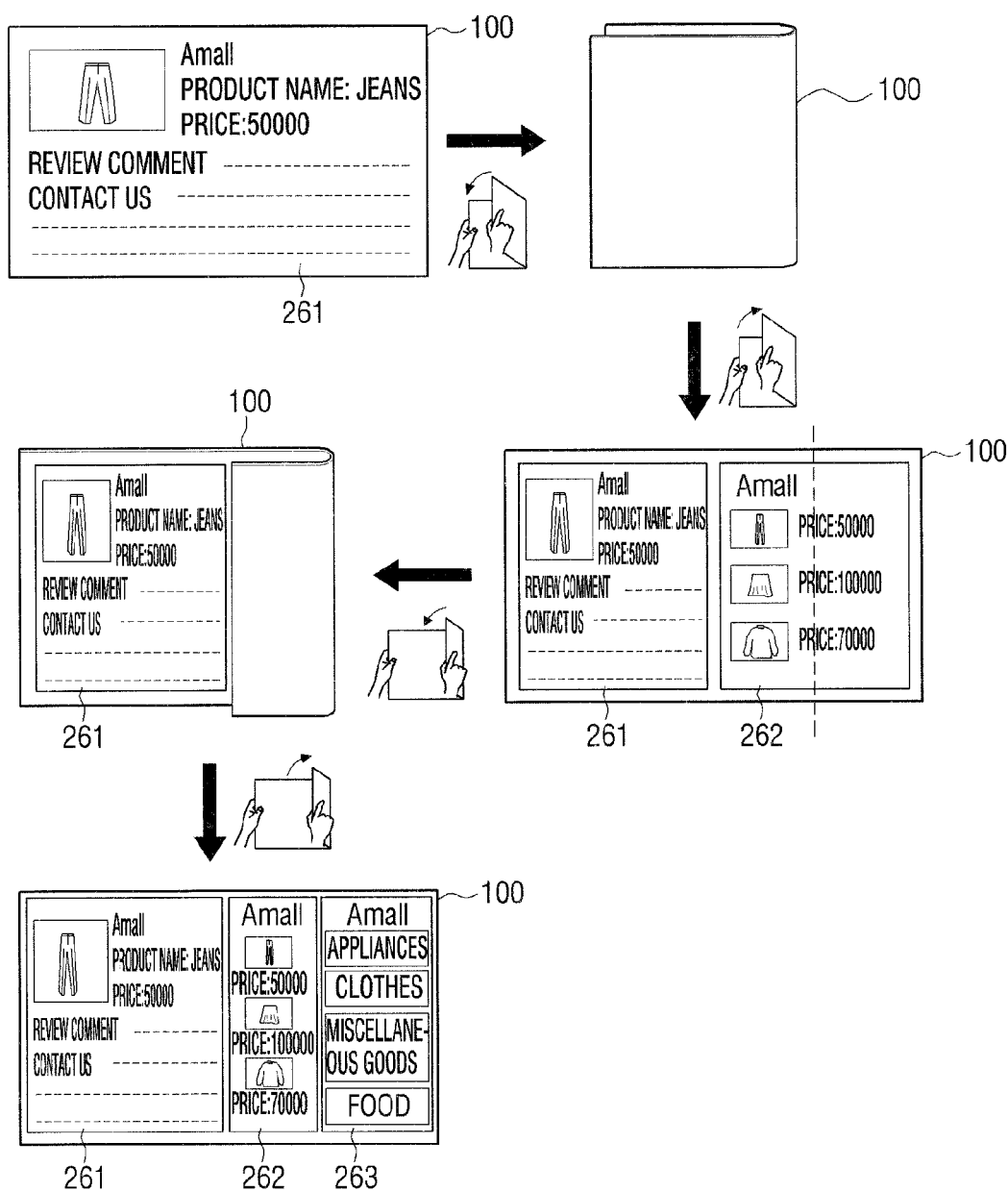

Referring to FIG. 26, it is assumed that the flexible display apparatus 100 is folded in half in a state in which a shopping mall web page 261 is displayed in a screen of the flexible display apparatus 100.

Subsequently, when a folding and a folding releasing manipulation is performed, the shopping mall web page 261 displayed in the original screen may be displayed in one of screens split on the basis of a folding line, and a previous web page 262 previously displayed may be displayed in the other split screen.

Further, when the region in which the previous web page 262 is displayed is folded in half, the previous web page 262 originally displayed on the basis of the folding line and a previous web page 263 which is a web page prior to the previous web page 262 may be displayed.

Figure 27:
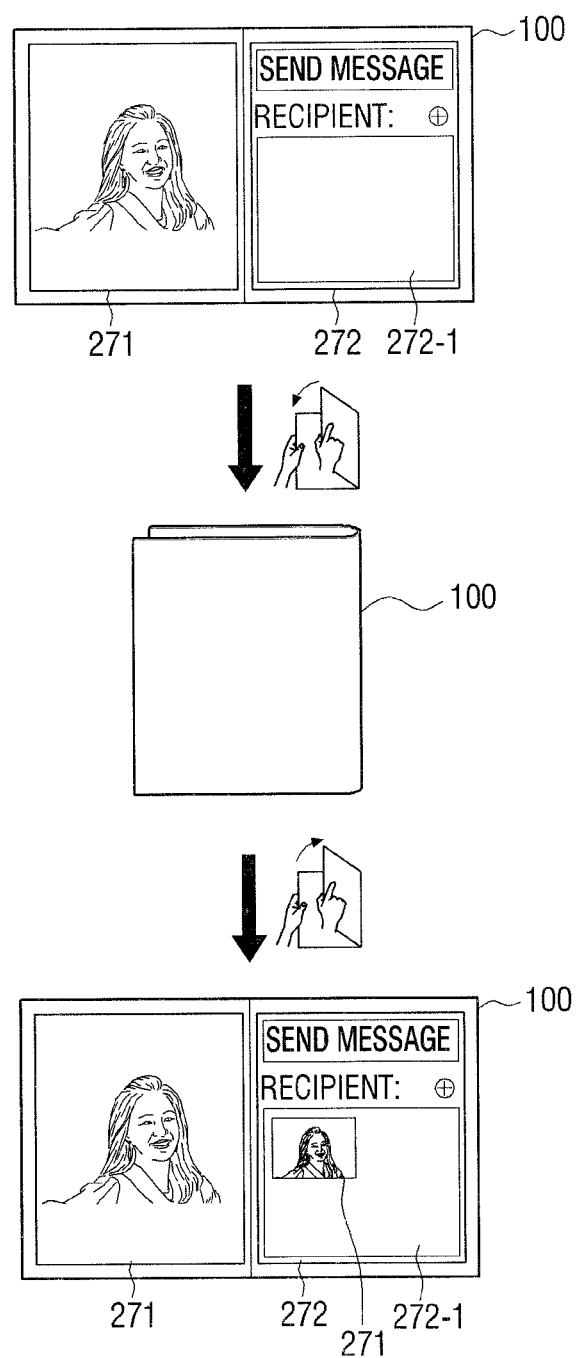

Referring to FIG. 27, it is assumed that the flexible display apparatus 100 is folded in half in a state in which image content 271 is displayed in the left screen of a screen of the flexible display apparatus 100 and a message creation screen 272 is displayed in the right screen.

Subsequently, when a folding and a folding releasing manipulation is performed, image content 271 displayed in the left screen may be added to a content entry 272-1 of the message creation screen 272 displayed in the right screen.

That is, according to the above-described embodiment, a function such as file attachment may be performed through the folding manipulation.

Figure 28:
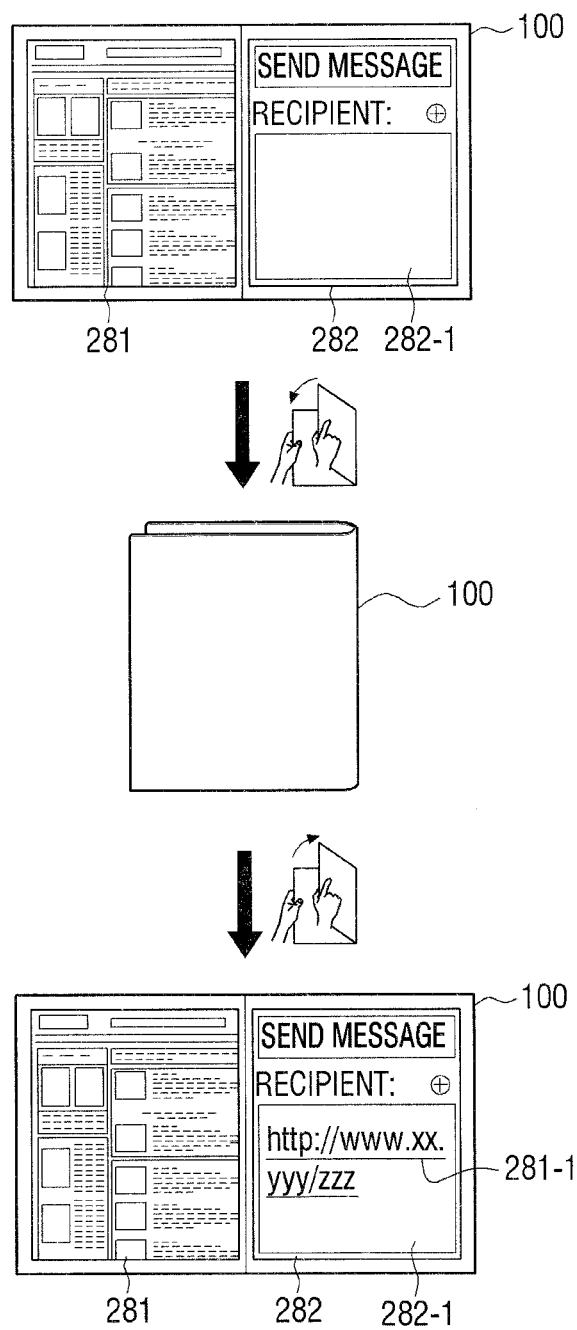

Referring to FIG. 28, it is assumed that the flexible display apparatus 100 is folded in half in a state in which a web page 281 is displayed in the left screen of a screen of the flexible display apparatus 100, and a message creation screen 282 is displayed in the right screen.

Subsequently, when a folding and a folding releasing manipulation is performed, a link address 281-1 of the web page 281 displayed in the left screen may be added to a content entry 282-1 of the message creation screen 282 displayed in the right screen. However, this is merely exemplary, and a web page image itself may be added in the web page through a bending-flap manipulation.

Figure 29:
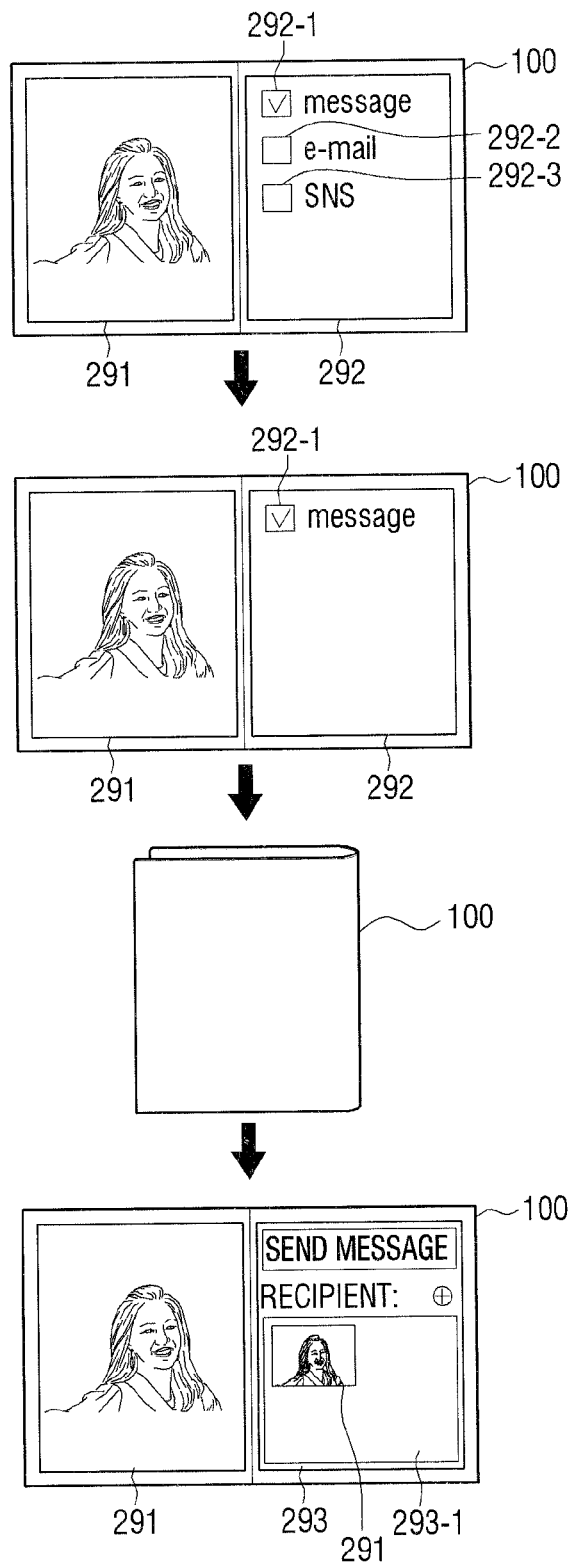

Referring to FIG. 29, image content 291 may be displayed in the left screen of a screen of the flexible display apparatus

100, and a menu screen 292 for selecting an application or program to which the image content 291 is to be added may be displayed in the right screen. The menu screen 292 displayed in the right screen may include various menu items to which the image content is to be added, for example, a message 292-1, an e-mail 292-2, Social Networking Service (SNS) 292-3, and the like.

Subsequently, after the flexible display apparatus 100 is folded in half in a state in which the message item 292-1 among the displayed menu items 292-1 to 292-3 is selected, when a folding releasing manipulation is performed, the image content 291 displayed in the left screen is added to a content entry 293-1 of the message creation screen 293 displayed in the right screen.

Figure 30:
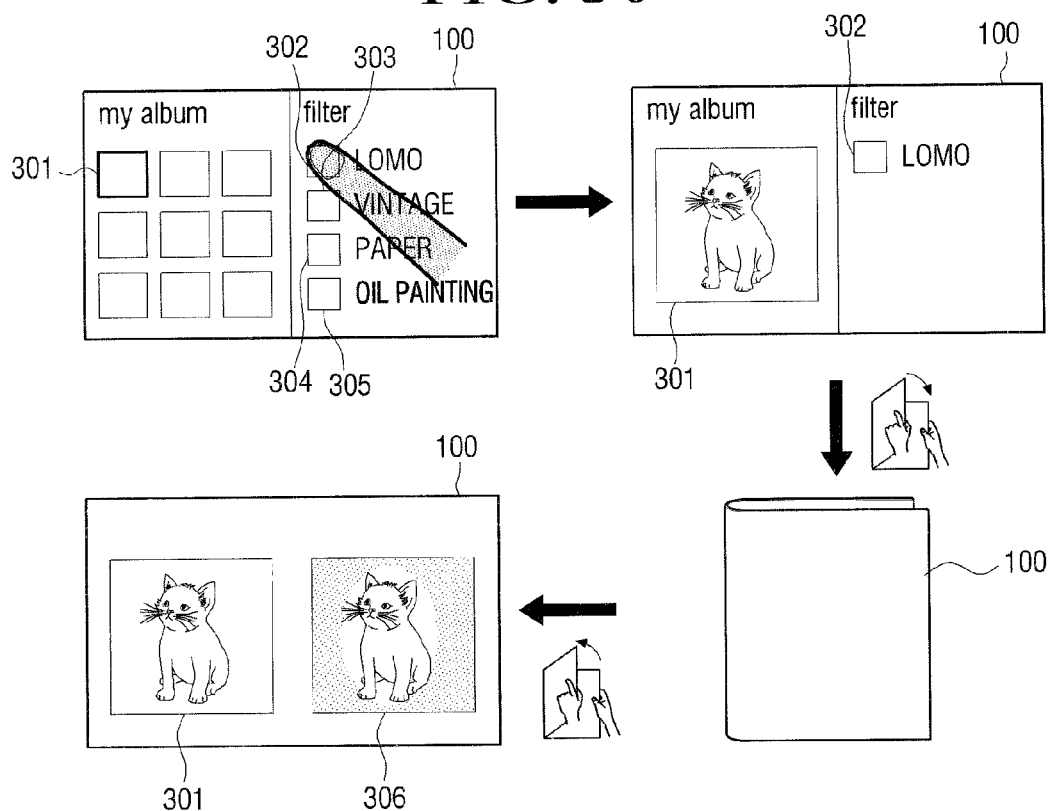

Referring to FIG. 30, an item of content 301 is displayed in the left screen and a lomo editing type 302 is displayed in the right screen after selecting the content 301 from image content displayed in the left screen of a screen and selecting the lomo editing type 302 from image editing types 302 to 305 that are displayed in the right screen.

As illustrated in FIG. 30, when a bending-flap manipulation for restoring to the original state is generated after the flexible display apparatus 100 is folded in half, the original content 301 originally displayed may be displayed in the left screen, and edited content 306 in which the original content 301 is edited by applying the lomo editing type may be displayed in the right screen.

That is, according to the embodiment, the bending-flap manipulation may be applied to a content editing function.

Figure 31:
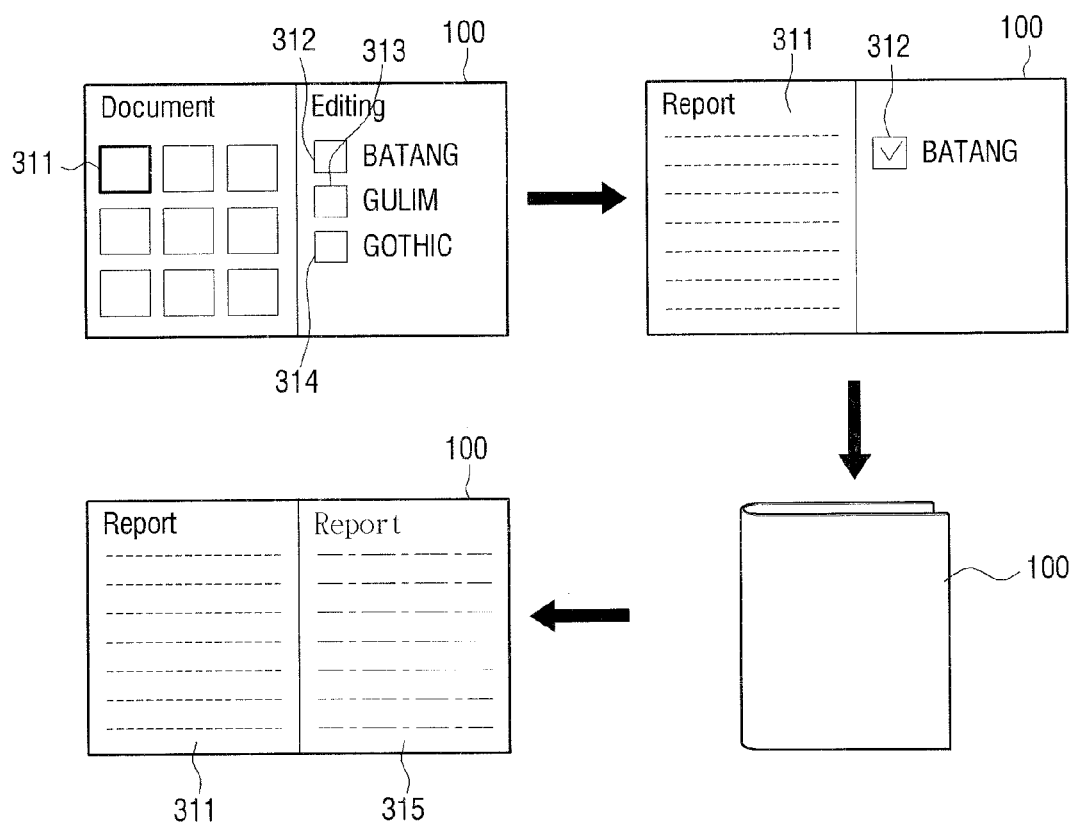

Referring to FIG. 31, it is assumed that one item of content 311 is selected in the left screen, and a batang font item 312 is selected in the right screen in a state in which a screen including a plurality of pieces of document content may be displayed in the left screen of a screen of the flexible display apparatus 100, and a plurality of document editing types, for example, a plurality of font items 312 to 314 are displayed in the right screen.

As illustrated in FIG. 31, when a bending-flap manipulation for restoring to the original state is generated after the flexible display apparatus is folded in half, the original content 311 originally displayed may be displayed in the left screen, and edited content 315 in which the original content 311 is edited by changing the font to a batang font may be displayed in the right screen.

That is, according to the embodiment, an edition for the document content including text as well as the image content may be performed.

Figure 32:
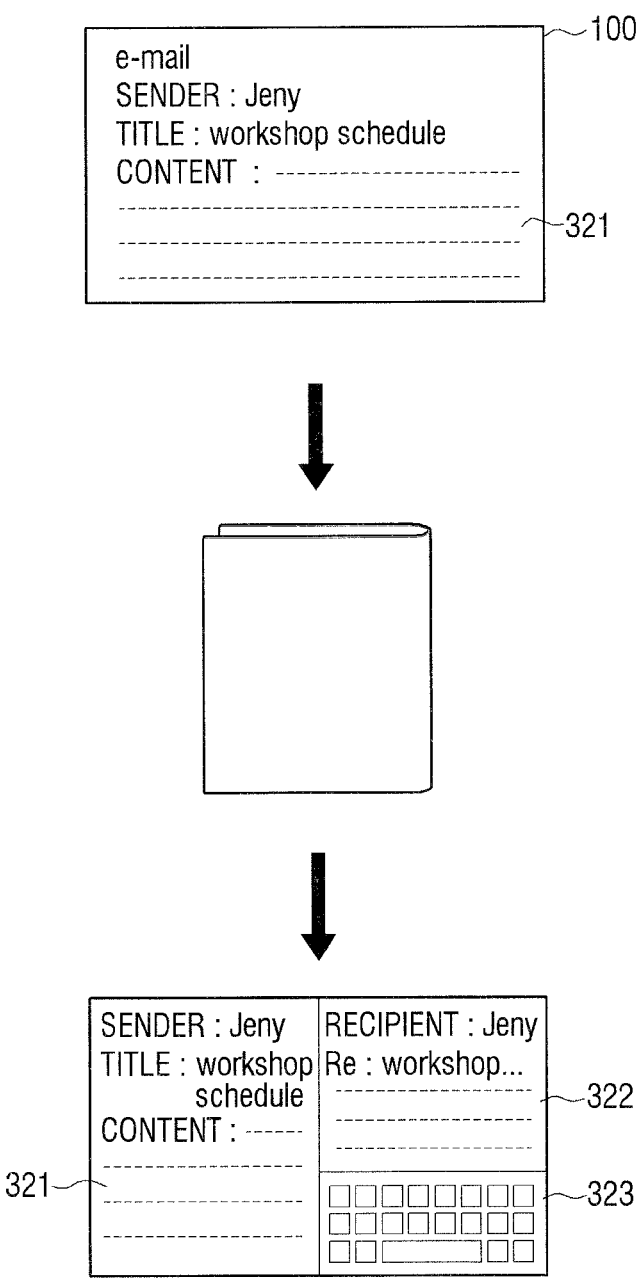

Referring to FIG. 32, when a bending-flap manipulation for restoring to the original state is generated after the flexible display apparatus 100 is folded in half in a state in which an e-mail screen is displayed, the e-mail screen originally displayed may be displayed in one of a plurality of regions divided on the basis of a folding line, and a screen related to the e-mail screen may be displayed in the other screen. For example, a screen 322 for writing a replay mail for the e-mail, and a keyboard screen 323 for inputting text to the right screen may be displayed in the right screen.

However, this is merely exemplary, and the function may be applied to a text message screen, and the like.

Figure 33:
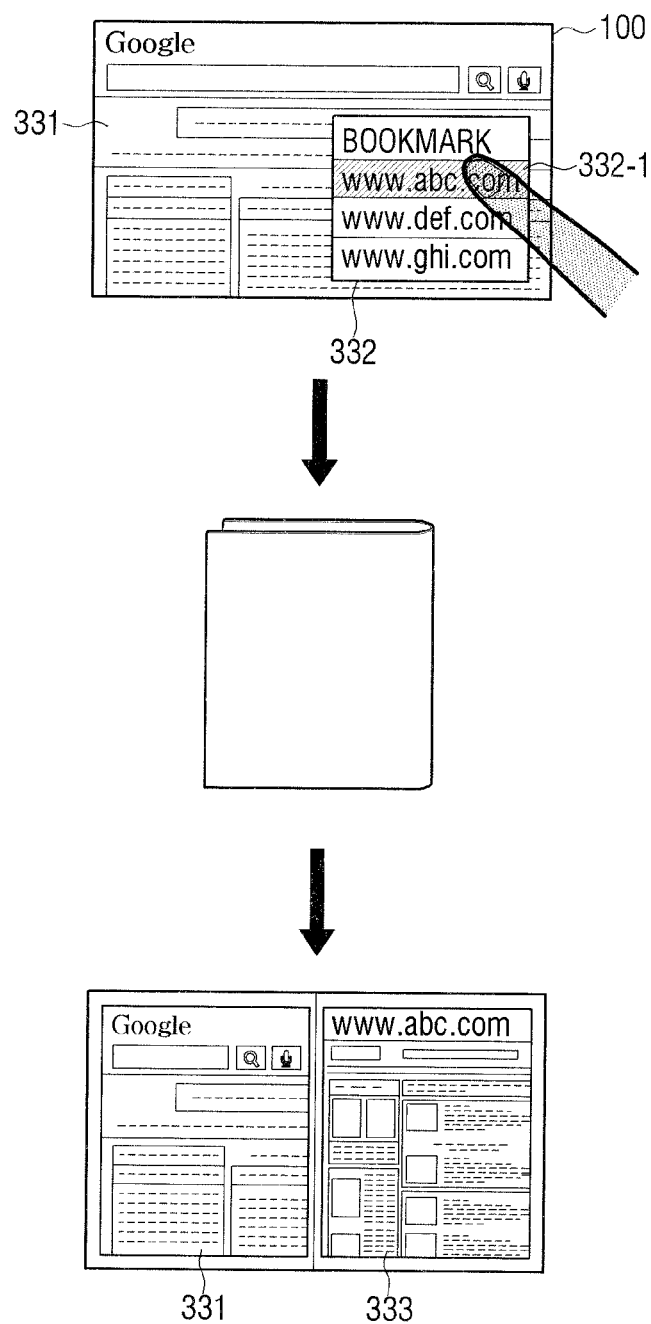

Referring to FIG. 33, it is assumed that a web address 332-1 registered as a bookmark is selected through a bookmark menu 332 in a state in which a web page 331 is displayed on a screen of the flexible display apparatus 100.

Subsequently, when a bending-flap manipulation for restoring to the original state is generated after the flexible display apparatus 100 is folded in half, the web page 331 originally displayed may be displayed in one of a plurality of screens divided on the basis of a folding line and a web page 333 corresponding to the web address 332-1 selected through the bookmark menu 332 may be displayed in the other screen.

Figure 34:
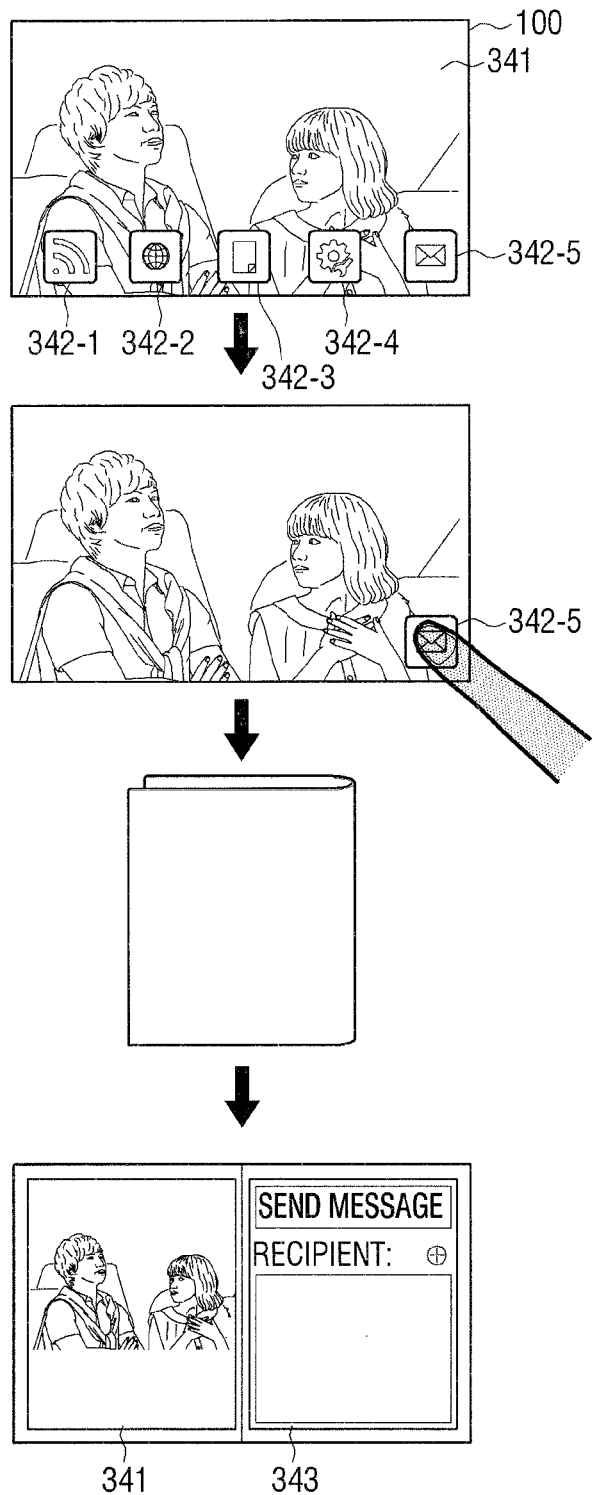

Referring to FIG. 34, in a state in which a content reproduction screen, for example, a moving image reproduction screen 341 is displayed on a screen of the flexible display apparatus 100, a plurality of icons 342-1 to 342-5 may be displayed on a bottom of the screen according to a preset event. Here, the preset event may be a user command for selecting another application.

Subsequently, when one icon 342-5 among the plurality of icons 342-1 to 342-5 is selected, only the selected icon 342-5 is displayed on the screen.

When a bending-flap manipulation for restoring to the original state is generated after the flexible display apparatus 100 is folded in half, the content reproduction screen 341 originally displayed may be displayed in one of a plurality of screens divided on the basis of a folding line, and an application execution screen such as, for example, a message creation screen 343 corresponding to the selected icon 342-5 may be displayed in the other screen.

While a specific function, an application, and the like are mapped to a specific region of the flexible display apparatus 100, the function, the application, and the like that is mapped to the region may be executed through a bending-flap manipulation for the region.

Figure 35:
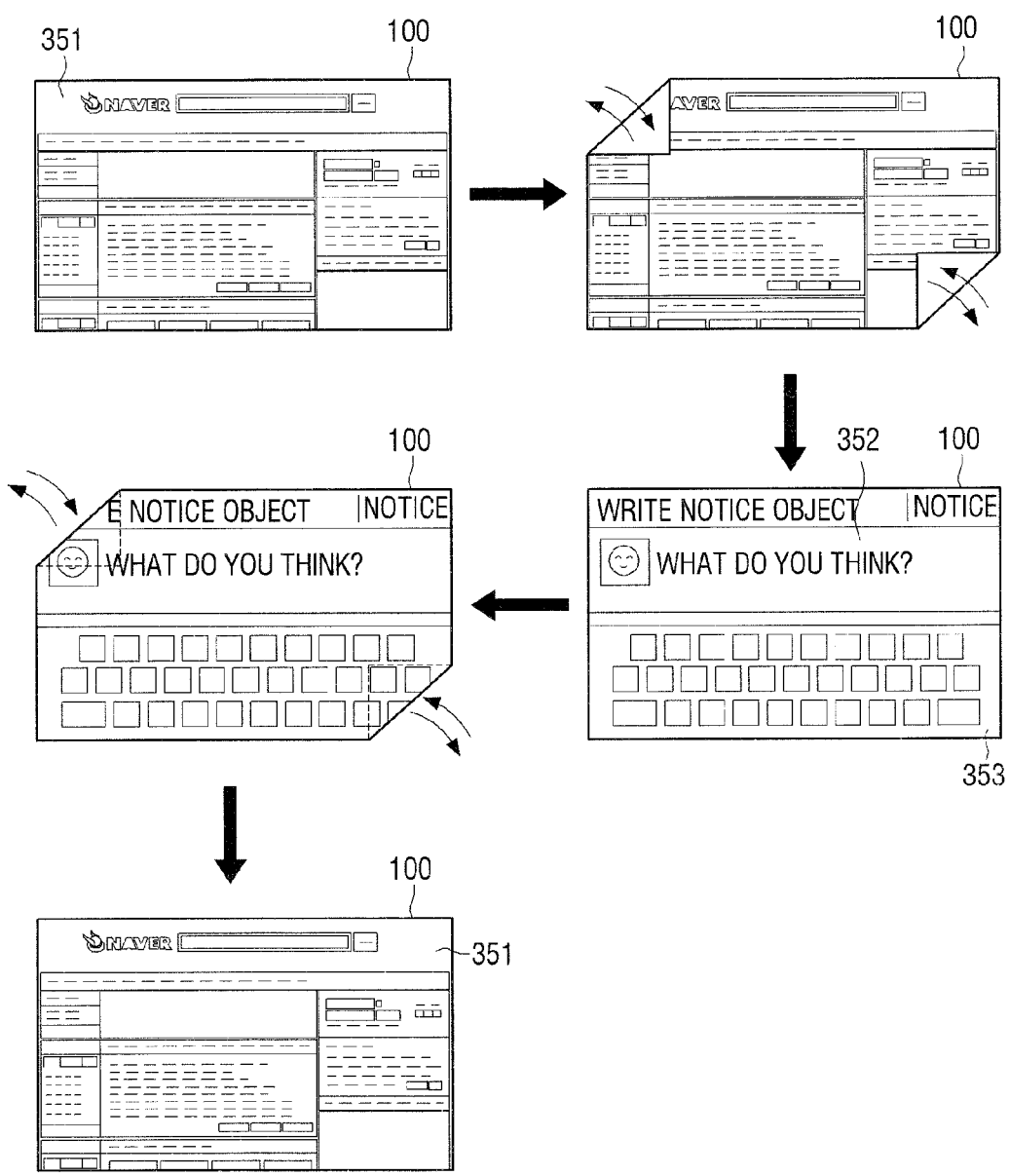

Referring to FIG. 35, a bending-flap manipulation for bending an upper left corner and a lower right corner of the flexible display apparatus 100 inward is generated in a state in which a web page 351 is displayed on a screen of the flexible display apparatus 100, a function mapped to a corresponding region may be executed. For example, as illustrated in FIG. 35, a pre-mapped input screen 352 and a corresponding input tool 353 may be displayed.

Further, when an outward bending-flap manipulation for bending the upper left corner and the lower right corner of the flexible display apparatus 100 is generated, the originally displayed screen 351 may be restored.

In the above-described embodiment, an example in which the original screen is restored when a banding-flap manipulation to an opposite direction to the bending-flap manipulation for executing the function is generated, is described, but this description is merely exemplary and the original screen may be restored through a bending-flap manipulation to the same direction as the bending-flap manipulation for executing the function. Further, it should be obvious to those skilled in the art that mapping of different functions, applications, and the like may be possible according to a folding direction and a folding region.

Figure 36:
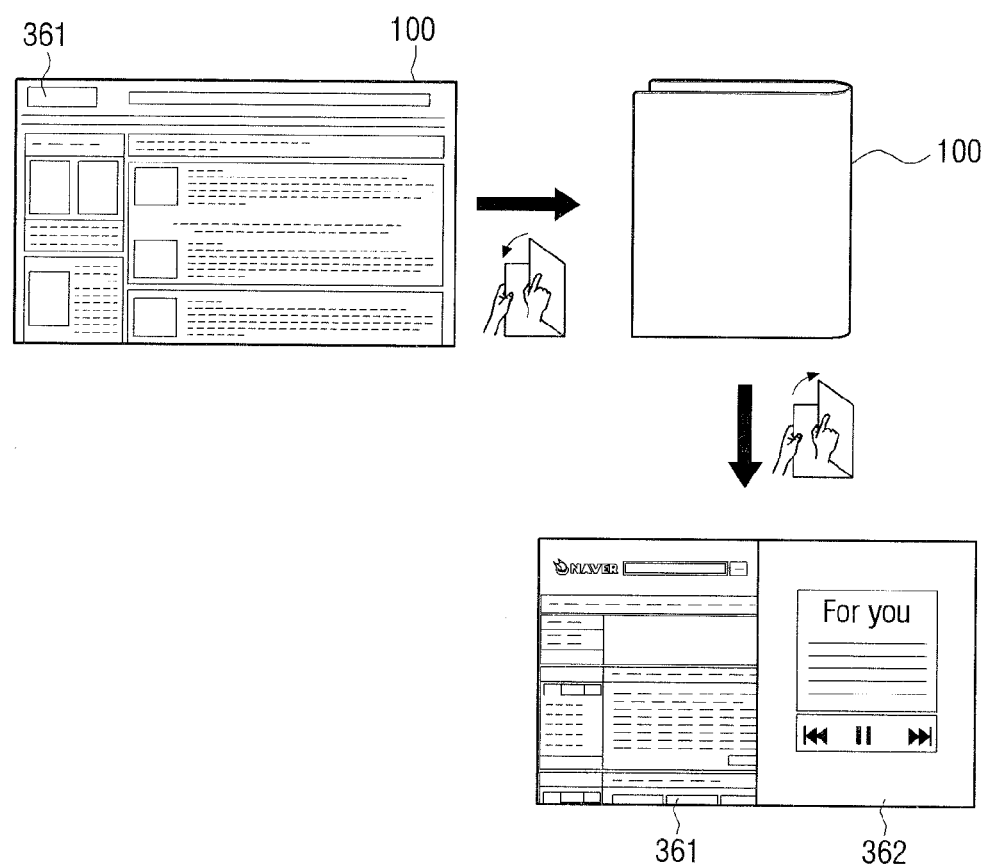

Referring to FIG. 36, when a bending-flap manipulation is generated in a state in which a specific screen is displayed in the flexible display apparatus 100, an application screen for multitasking may be displayed.

When the bending-flap manipulation is generated in a state in which a web page 361 is displayed in a screen of the flexible display apparatus 100, the web page 361 originally displayed may be displayed in the left screen, and an application screen for multitasking, for example, a music application screen 362 may be displayed in the right screen.

Figure 37:
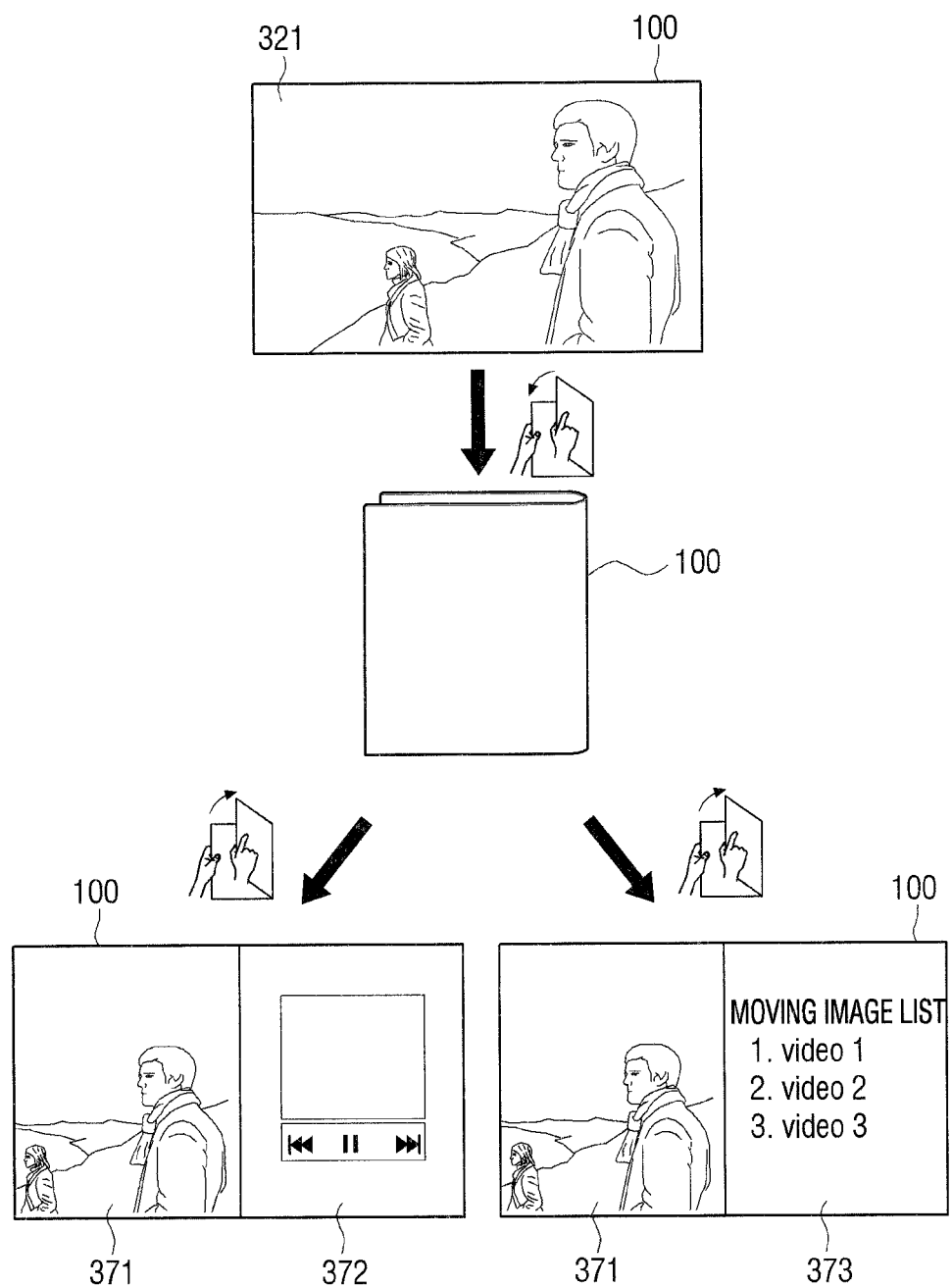

Referring to FIG. 37, when a bending-flap manipulation is generated in a state in which a specific screen is displayed in the flexible display apparatus 100, a screen related the displayed screen may be displayed.

When the bending-flap manipulation is generated in a state in which a moving image 371 is reproduced on the screen of the flexible display apparatus 100, a screen related to the reproduced moving image, for example, a control screen configured to control a moving image reproduction state may be displayed in the right screen.

Further, as illustrated in FIG. 37, information corresponding to a category of the content such as, for example, a moving image list 373 may be displayed.

The flexible display apparatus 100 may be combined with a display accessory such as a foldable cover 380.

At this time, the flexible display apparatus 100 may be bent on the basis of a folding line provided in the cover 380.

Figure 38:
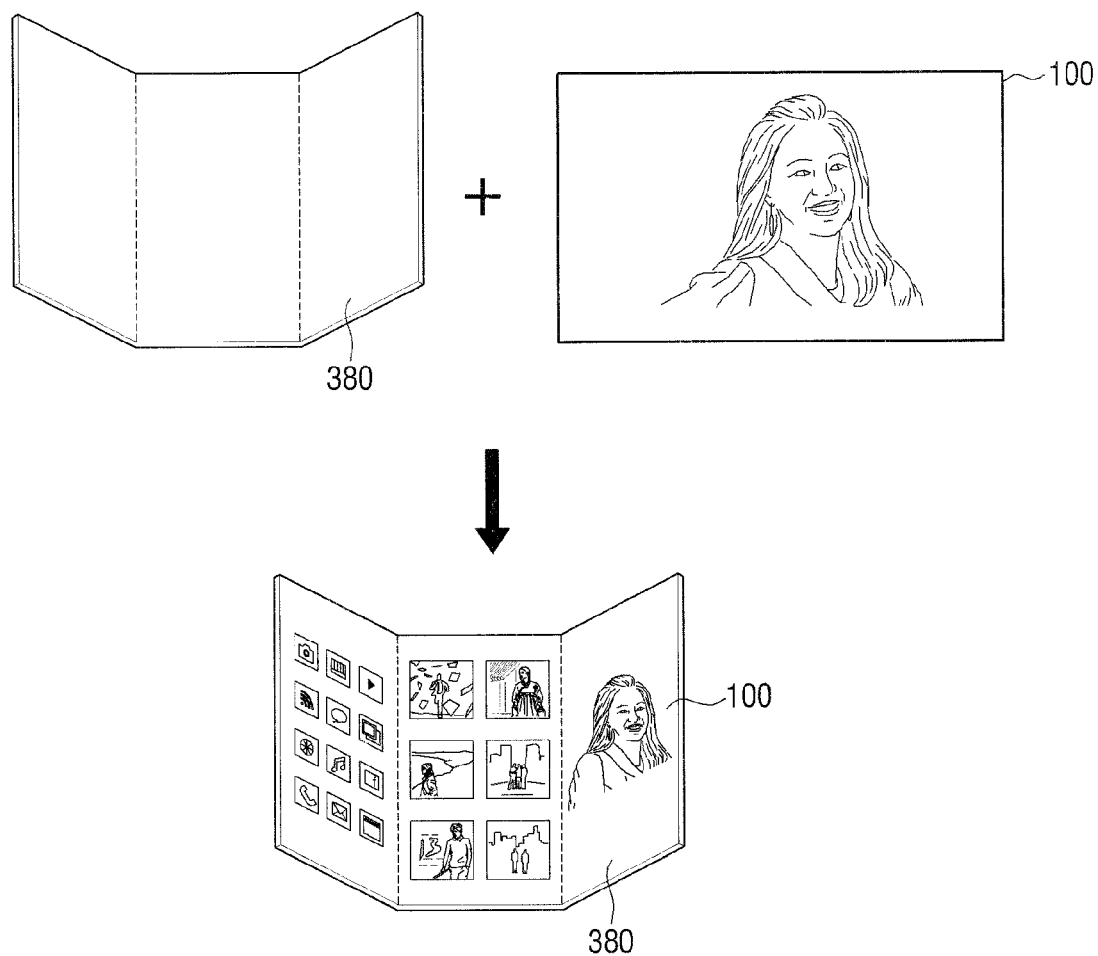

Referring to FIG. 38, when the cover 380 has a double-foldable structure, the flexible display apparatus 100 may also be bent or folded twice according to the structure of the cover 380. Further, the flexible display apparatus may reconstruct and display a screen corresponding to the screen generated in a bent state.

For example, content displayed in a screen may be resealed and displayed in a screen generated in the right region, and content included in a category associated with the content generated in the right region may be displayed in a screen generated in the central region. Further, a home screen may be displayed in a screen generated in the left region. Here, screens displayed in the screens may be pre-stored, received from outside sources, or generated in real time. For example, a home UI screen corresponding a ⅓ size of an entire screen may have been pre-stored.

Figure 39A:
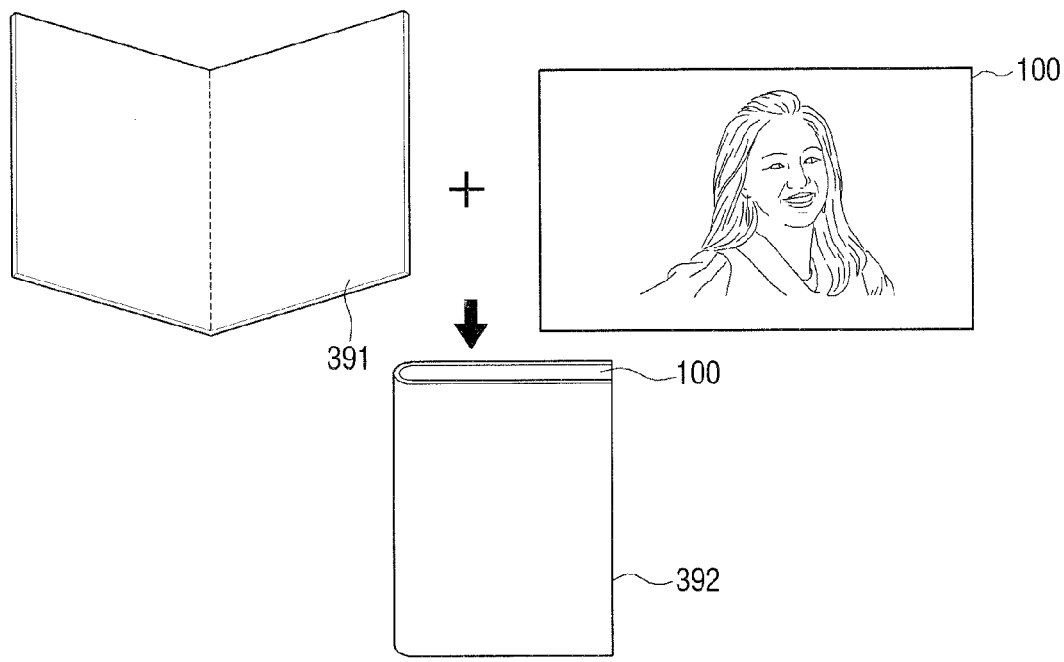

Referring to FIG. 39A, when a cover 391 has a structure to be folded in half once, the flexible display apparatus 100 may also be folded in half once when the flexible display apparatus 100 is combined with the cover 391.

Figure 39B:
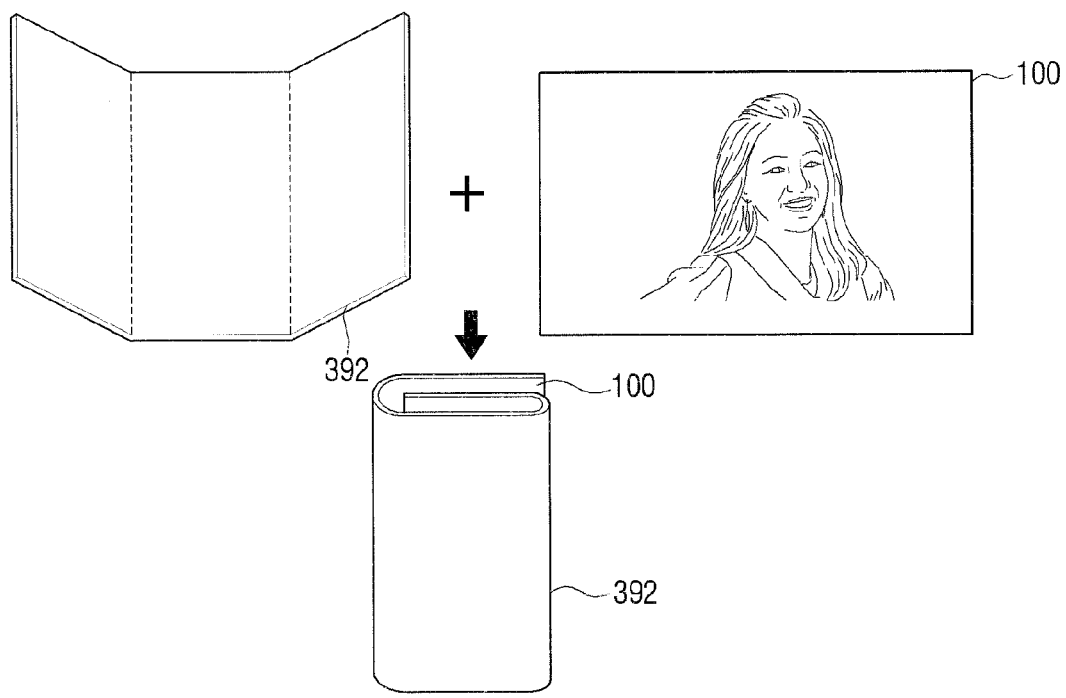

Referring to FIG. 39B, when a cover 392 has a structure to be folded twice, the flexible display apparatus 100 may also be folded twice when the flexible display apparatus 100 is combined with the cover 392.

In the above-described embodiments, the example in which the flexible display apparatus 100 is bent in a perpendicular state with respect to at least one side is described. However, the various embodiments may be applied when the flexible display apparatus is bent in a tilted state with respect to the at least one side.

FIGS. 40A, 40B, 41, and 42 are views illustrating an implementation type of a flexible display apparatus according to various embodiments of present disclosure.

Referring to FIGS. 40A and 40B, a flexible display apparatus 100 of the embodiment may be implemented in various types.

FIG. 40A illustrates an example in which the flexible display apparatus 100 is implemented in a stereoscopic display apparatus. Referring to FIG. 40A, in the flexible display apparatus, a display 110 is provided on one surface, and a variety of hardware such as a button, speaker, microphone, or an infrared (IR) source are provided on another surface.

As illustrated in FIG. 40A, at least part of a housing in the flexible display apparatus 100 may be manufactured of robber or another polymer resin so that the flexible display apparatus may be bendable. The flexible display apparatus 100 may have a flexible property in the whole structure or a portion thereof The flexible display apparatus 100 may perform a new operation different from a previous operation according to a bending. For example, when the flexible display apparatus performs a remote controller function for controlling an external apparatus in a normal state, the flexible display apparatus may perform a call function when a bending gesture is made in one region. When the remote controller function is performed, the remote control functions may be displayed in the display 110. When the call function is performed, a dial pad may be displayed in the display 110.

FIG. 40B illustrates that a flexible display apparatus 100 is implemented in a circular shape. Thus, the flexible display apparatus 100 may perform visually and functionally different operations according to an orientation or a folded state. For example, while the flexible display apparatus may display a photo or other content when the flexible display apparatus is horizontally placed on a floor, the flexible display apparatus may perform a table clock function when the flexible display apparatus is oriented vertically on the floor. When a central portion of the flexible display apparatus is bent to about 90 degrees, the flexible display apparatus may perform a laptop PC function.

Figure 41:
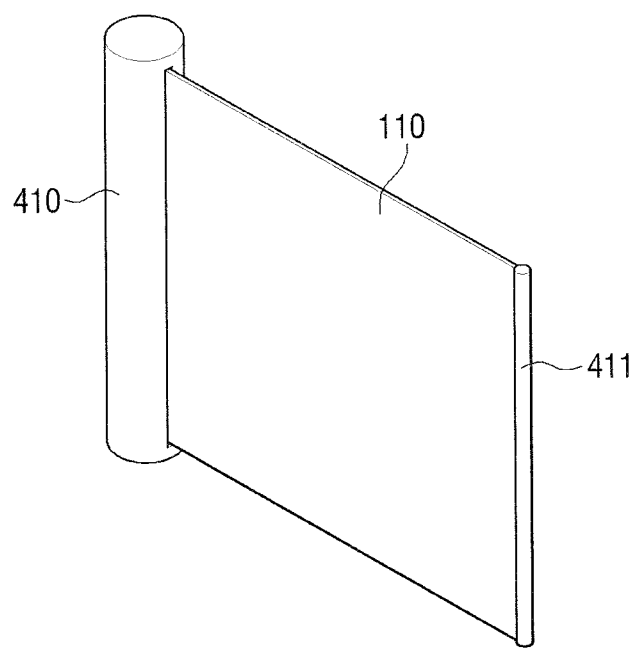

FIG. 41 is a view illustrating an example of a flexible display apparatus embedded in a main body.

Referring to FIG. 41, a flexible display apparatus 100 may include a main body 410, a display 110, and a grip part 411.

The main body 410 functions as a case for containing the display 110. When the flexible display apparatus 100 includes the various components as illustrated in FIG. 18, components other than the display 110 and some sensors may be mounted on the main body 410. The main body 410 includes a rotational roller (not shown) configured to roll-up the display 110. Thus, when the display is unused, the display 110 is rolled-up using the rotational roller to be embedded within the main body 410.

When the user grasps and pulls the grip part 411, the rotational roller rotates to a direction opposite a rolling direction and the display 110 pulls out of the main body 410. A stopper may be provided in the rotational roller. Thus, when the user pulls the grip part 411 by a certain distance or more, the rotation of the rotational roller may stop by the stopper and the display 110 may be fixed in position. Accordingly, the user may execute various functions using the display 110 exposed to the outside. When the user presses a button for releasing the stopper, the rotational roller rotates in a reverse direction while the stopper is released to roll the display 110 into the main body 410 again. The stopper may have a switch shape for stopping an operation of a gear configured to rotate the rotation roller. Since structures used in existing rolling structures may be used for the rotation roller and stopper, detailed illustration and description thereof will be omitted.

A power supply (not shown) may be included in the main body 410. The power supply may be implemented in various types such as a battery connector on which a non-rechargeable battery is mounted, a secondary battery which charged and used many times by the user, or a solar cell which generates power using solar heat. When the power supply is implemented as the solar cell, the user connects the main body 410 to the external power in a wired manner to charge the power supply.

Although FIG. 41 illustrates a cylindrical-shaped main body 410, the main body 410 may be implemented in a tetragonal shape or another polygonal shape. Further, other than a shape in which the display 110 is embedded in the main body 410 and exposed to the outside by pulling, the display 110 may be implemented in a form to surround the outside of the main body or other various forms.

Figure 42:
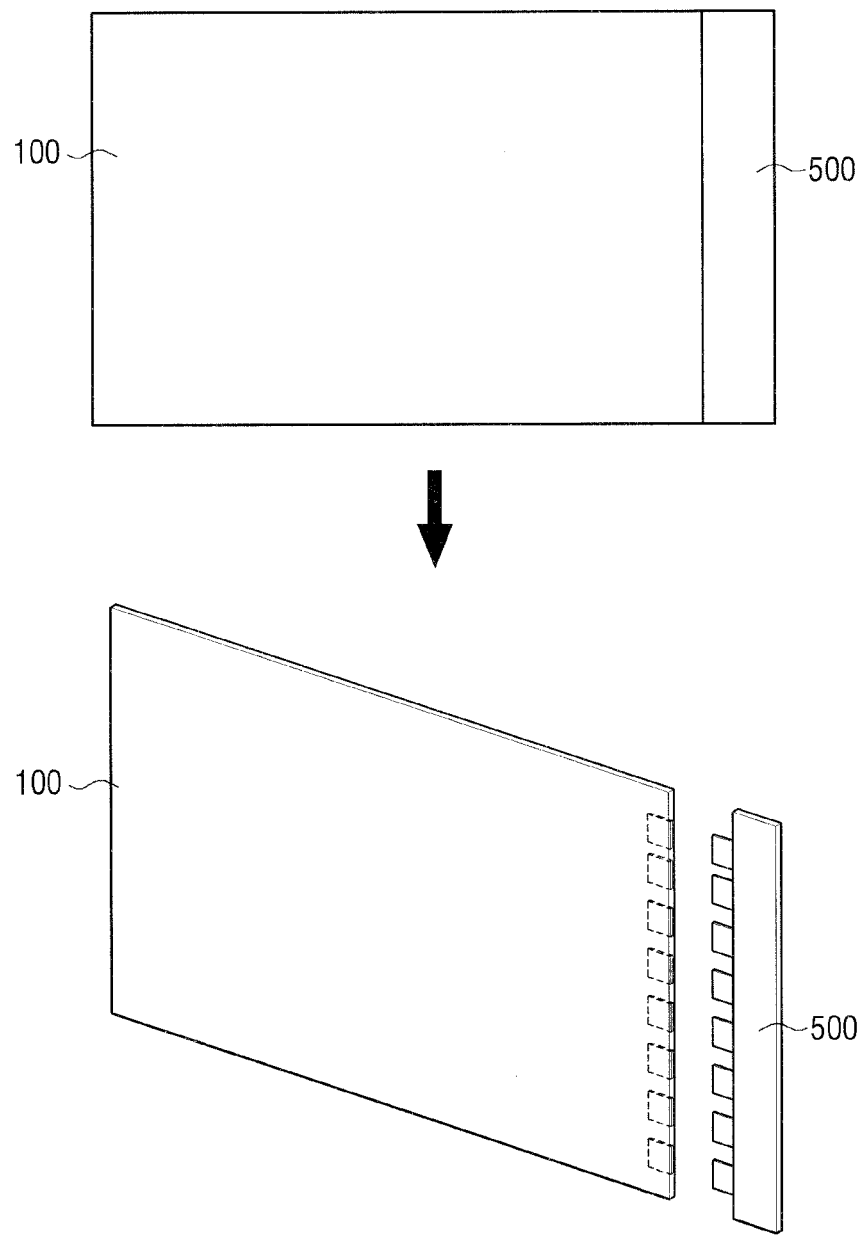

FIG. 42 is a view illustrating a flexible display apparatus to which a power supply 500 is detachable and attachable.

Referring to FIG. 42, the power supply 500 may be provided in one-sided edge of the flexible display apparatus to be detachable and attachable from and to the flexible display apparatus.

The power supply 500 may be implemented of a flexible material to be bent together with the display 110. Specifically, the power supply 500 may include a cathode current collector, a cathode, an electrolyte part, an anode, an anode current collector, and a cover covering the components.

As an example, the current collector may be implemented of a conductive material, for example, an alloy such as a TiNi-based alloy having an elastic property, a pure metal such as copper (Cu) or aluminum (Al), a carbon-coated pure metal, carbon, carbon-fiber, or the like, a conductive polymer such as polypyrrole, or the like.

The cathode may be manufactured of a cathode material, for example, a metal such as lithium (Li), sodium (Na), zinc (Zn), magnesium (Mg), cadmium (Cd), hydrogen storage alloy, or lead (Pb), a non-metal such as carbon, or a polymer electrode material such as organic sulfur.

The anode may be manufactured of an anode material such as the sulfur and metal sulfide, a lithium transition metal oxide such as $LiCoO_2$, $SOCl_2$, $MnO_2$, $Ag_2O$, $Cl_2$, $NiCl_2$, NiOOH, or a polymer electrode material. The electrolyte part may be implemented in a gel type using PolyEthylene Oxide (PEO), PolyVinlyidene diFluoride (PVdF), Polymethyl-methacrylate (PMMA), or Polyvinylacetate (PVAC).

The cover may include a general polymer resin. For example, PolyVinyl Chloride (PVC), High Density Polyethylene (HDPE), or an epoxy resin may be used as the cover. In addition, any material that prevents a thread-like battery from being damaged and is freely bendable or flexible may be used as the cover.

The anode and the cathode of the power supply 500 may include connectors configured to be electrically connected to the other sources and devices.

Referring to FIG. 42, each of the connector is formed in a form protruding from the power supply 500 and a groove corresponding to a location, a size, or a shape of the connector is formed in the display 110. Therefore, the power supply 500 may combined with the display through combination of the connector with the groove. The connector of the power supply 500 may be connected to a power connection pad (not shown) in the flexible display apparatus 100 to supply power.

Although FIG. 42 illustrates that the power supply 500 is detachable/attachable from/to the one-sided edge of the flexible display apparatus 100, this is merely exemplary. The location and shape of the power supply 500 may be changed according to product characteristics. For example, when the flexible display apparatus 100 is a product having a thickness of a certain degree, the power 500 may be mounted on a rear side of the flexible display apparatus 100.

In the above-described embodiments, the example in which the flexible display apparatus 100 includes a display has been illustrated, but the present disclosure may be applied to a flexible display apparatus not including a display. For example, when the flexible display apparatus operates as a remote control apparatus which is connected to an external display apparatus and controls the external display apparatus, a function corresponding to a bending-flap manipulation may be performed in the external display apparatus according to the bending-flap manipulation to the flexible display apparatus. For example, in a state in which content is displayed in the external display apparatus, when it is determined that the flexible display apparatus connected to the external display apparatus is bent from a first form to a second form, and the restored to the first form, a first screen is generated in one region of a display of the external display apparatus according to a control signal transmitted from the flexible display apparatus, and the content is reconstructed and displayed in the generated first screen. At this time, an entire screen of the display provided in the external display apparatus and an entire region of the flexible display apparatus may be 1:1 correspondence. In some cases, a partial screen of the display provided in the external display apparatus may match the entire region of the flexible display apparatus to be operated. The same principle may be applied to other exemplary embodiments, and thus detailed description thereof will be omitted.

According to the embodiments of the present disclosure, the bending-flap manipulation may be variously used to execute functions.

The above-described methods may be implemented in an application.

For example, a non-transitory computer-recordable medium, in which a program for executing displaying content on a screen, detecting bending of the display from a first form to a second form, and reconstructing the content based on the bending and displaying the reconstructed content on a first screen generated in one region of the display when it is determined that the display is restored to the first form may be provided.

In addition, a non-transitory computer-recordable medium, in which a program for executing screen display methods according to the above-described embodiments is stored, may be provided.

The non-transitory computer-recordable medium an apparatus-readable medium configured to semi-permanently store data. Specifically, the above-described applications or programs may be stored and provided in the non-transitory apparatus-readable medium such as a Compact Disc (CD), a Digital Versatile Disc (DVD), a hard disc, a Blu-ray disc, USB storage device, a memory card, a ROM, and the like.

Accordingly, when existing flexible display apparatuses have a bending sensing structure, a program is installed on the existing flexible display apparatuses and a function according to the bending-flap manipulation may be performed as described above.

While the present disclosure has been shown and described with reference to various embodiments thereof, it will be understood those skilled in the art that various changes in form and details may be made therein without departing from the spirit and scope of the present disclosure as defined by the appended claims and their equivalents.

What is claimed is:

1. A flexible display apparatus, the apparatus comprising:
   a display configured to display a screen including content to be edited and an editing condition to edit the content, selectable by the user;
   a sensor configured to detect bending of the display from a first form to a second form; and
   a controller configured to display the content edited according to the editing condition selected by the user in a first region of the screen in response to a restoration of the display to the first form.

2. The apparatus of claim 1, wherein the one region of the screen is one of a plurality of regions divided by a bending line generated based on the bending.

3. The apparatus of claim 1, wherein the first form is a state in which the display is flat, and the second form is a state in which a partial region of the display is bent.

4. The apparatus of claim 1, wherein the controller displays the content according to the editing condition in an entire screen.

5. The apparatus of claim 1, wherein the controller displays related content or main content corresponding to the content in a second region generated in a remaining region of the screen based on the bending, and wherein the content includes at one or more of an application execution screen, a web page, an image, text, a moving image, a widget screen, a menu screen, and an icon.

6. The apparatus of claim 1, wherein the controller generates and displays a third region on the one region of the first region when the bending of the first region is detected.

7. The apparatus of claim 1, wherein the controller generates and displays the first region on the one region of the screen to correspond to a preset bending structure when the bending is detected and the flexible display apparatus is combined with a display accessory having the preset bending structure.

8. The apparatus of claim 1, further comprising a storage unit configured to store User Interface (UI) screen information corresponding to a size of the first region that is generated based on the bending,
wherein the controller reconstructs the content displayed in the first region based on the UI screen information corresponding to the size of the first region.

9. A method of controlling a flexible display apparatus, the method comprising:
displaying a screen including content to be edited and an editing condition to edit the content, selectable by a user;
detecting bending of the display from a first form to a second form; and
displaying the content edited according to the editing condition selected by the user in a first region of the screen in response to a restoration of the display to the first form.

10. The method of claim 9, wherein the one region of the screen is one of a plurality of regions divided by a bending line generated based on the bending.

11. The method of claim 9, wherein the first form is a state in which the display is flat, and the second form is a state in which a partial region of the display is bent.

12. The method of claim 9, wherein the reconstructing and the displaying of the content includes displaying the content according to the editing condition in the entire screen.

13. The method of claim 9, wherein the reconstructing and the displaying of the content includes displaying related content or main content corresponding to the content in a second region generated in a remaining region of the screen based on the bending, and
wherein the content includes one or more of an application execution screen, a web page, an image, text, a moving image, a widget screen, a menu screen, and an icon.

14. The method of claim 9, further comprising generating and displaying a third region on the one region of the first region when the bending of the first region is detected.

15. The method of claim 9, wherein the reconstructing and the displaying of the content includes generating and displaying the first region on the one region of the screen to correspond to a preset bending structure when the bending is detected and the flexible display apparatus is combined with a display accessory having the preset bending structure.

16. The method of claim 9, wherein the reconstructing and the displaying of the content includes reconstructing the content displayed in the first region based on User Interface (UI) screen information corresponding to a size of the first region.

* * * * *